United States Patent
Burnsed et al.

(10) Patent No.: US 10,763,092 B2
(45) Date of Patent: Sep. 1, 2020

(54) DUAL-SPECTRUM PHOTOCATHODE FOR IMAGE INTENSIFICATION

(71) Applicant: L-3 Communications Corporation-Insight Technology Division, Tempe, AZ (US)

(72) Inventors: Jon Burnsed, Tempe, AZ (US); Stephen Styonavich, Tempe, AZ (US)

(73) Assignee: L-3 COMMUNICATIONS CORPORATION-INSIGHT TECHNOLOGY DIVISION, Tempe, AZ (US)

( * ) Notice: Subject to any disclaimer, the term of this patent is extended or adjusted under 35 U.S.C. 154(b) by 0 days.

(21) Appl. No.: 15/826,489

(22) Filed: Nov. 29, 2017

(65) Prior Publication Data

US 2019/0164733 A1 May 30, 2019

(51) Int. Cl.
| | |
|---|---|
| *G01J 1/04* | (2006.01) |
| *H01J 43/04* | (2006.01) |
| *G01J 1/44* | (2006.01) |
| *H01J 9/12* | (2006.01) |
| *H01J 31/50* | (2006.01) |

(52) U.S. Cl.
CPC .............. *H01J 43/04* (2013.01); *G01J 1/0411* (2013.01); *G01J 1/44* (2013.01); *H01J 9/12* (2013.01); *H01J 31/50* (2013.01); *G01J 2001/4493* (2013.01)

(58) Field of Classification Search
CPC ........ G02B 23/12; H01J 31/49; H01J 29/458; H01J 31/50; H01J 2231/50026
See application file for complete search history.

(56) References Cited

U.S. PATENT DOCUMENTS

| | | | | |
|---|---|---|---|---|
| 2005/0250243 | A1* | 11/2005 | Bonnell | B81B 1/00 438/57 |
| 2006/0038251 | A1* | 2/2006 | Gidon | H01L 27/14647 257/443 |
| 2012/0181433 | A1* | 7/2012 | Azzazy | H01J 31/26 250/349 |
| 2013/0153767 | A1* | 6/2013 | Savoy | G01J 5/20 250/338.1 |
| 2018/0096829 | A1* | 4/2018 | Conde | H01J 1/34 |

* cited by examiner

*Primary Examiner* — David P Porta
*Assistant Examiner* — Mamadou Faye
(74) *Attorney, Agent, or Firm* — Grossman, Tucker, Perreault & Pfleger, PLLC

(57) ABSTRACT

A dual-spectrum photocathode capable of emitting photoelectrons into a first vacuum space includes a first photodetector array formed using a first optoelectronic material that generates photo-electrons responsive to incident electromagnetic energy in a first spectral band. The dual-spectrum photocathode also includes a second photodetector array formed using a second optoelectronic material that generates photo-electrons responsive to incident electromagnetic energy in a second spectral band that is different from the first spectral band. The first spectral band may include the visible electromagnetic spectrum between 390 nanometers and 700 nanometers and the second spectral band may include the short-wave infrared (SWIR) electromagnetic spectrum above 900 nanometers.

20 Claims, 18 Drawing Sheets

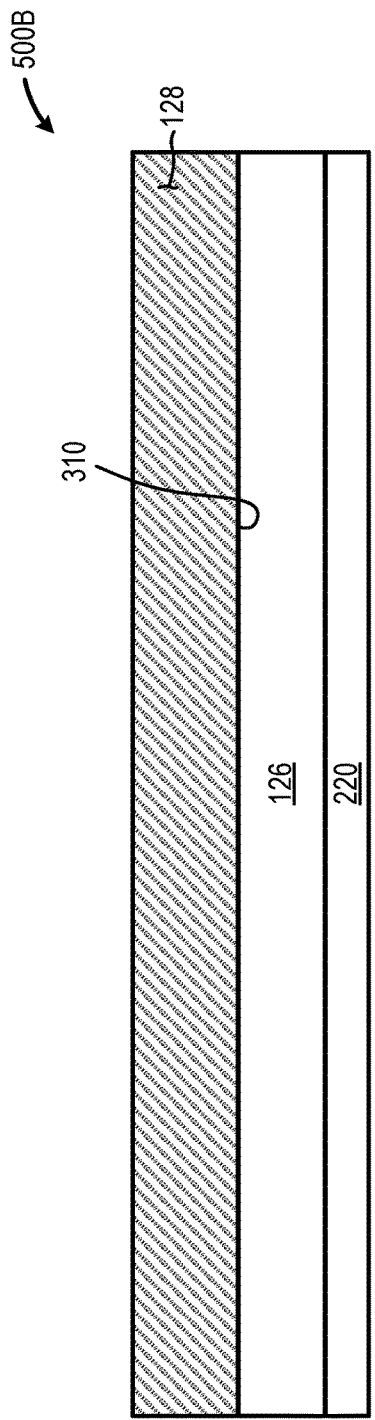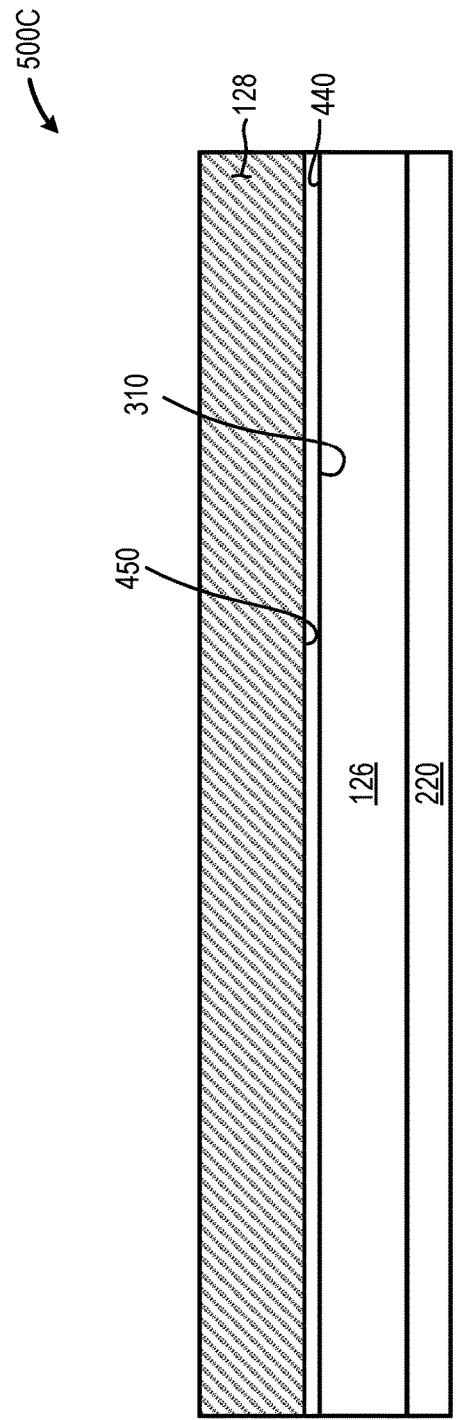

DUAL-SPECTRUM PHOTOCATHODE FOR IMAGE INTENSIFICATION

TECHNICAL FIELD

The present disclosure relates to systems and methods for performing image intensification using a dual-spectrum photocathode.

BACKGROUND

An image intensifier intensifies (or amplifies) an image having a low level of ambient light (e.g., ambient lighting in a nighttime environment) to a level sufficient for detection of persons and objects by the human eye. Each image intensifier typically includes a photocathode, an electron multiplier such as a microchannel plate, and a phosphor screen. Typically, a first voltage differential between the photocathode and the microchannel plate creates a first electric field in the vacuum between the photocathode and the microchannel plate. A second voltage differential is maintained across the microchannel plate (i.e., the inlet side of the microchannel plate is at a different voltage than the outlet side of the microchannel plate). A third voltage differential between the microchannel plate and the phosphor screen creates a third electric field in the vacuum between the microchannel plate and the phosphor screen.

Enhanced vision systems that include an image intensifier operate by collecting or capturing existing light photons using a simple or compound objective lens array converting the captured photons to photo-electrons using a photocathode, multiplying the photo-electrons to provide a large number of electrons, and creating an image on a phosphor screen. The source of the existing photons may be naturally occurring (e.g., starlight, moonlight) or artificially generated (e.g., street lights, defined wavelength illuminators).

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

FIG. 5B is a partial cross-sectional elevation of the illustrative dual-spectrum photocathode depicted in FIG. 5A along sectional line 5B-5B, in accordance with at least one embodiment described herein;

FIG. 5C is an expanded cross-sectional elevation of the illustrative dual-spectrum photocathode depicted in FIG. 5A along sectional line 5C-5C in which an interposer layer is deposited continuously across at least a portion of the upper surface of the first optoelectronic material layer forming the first photodetector array, such that the interposer layer is disposed between the upper surface of the first photodetector array and the second photodetector array, in accordance with at least one embodiment described herein;

Figure 1:
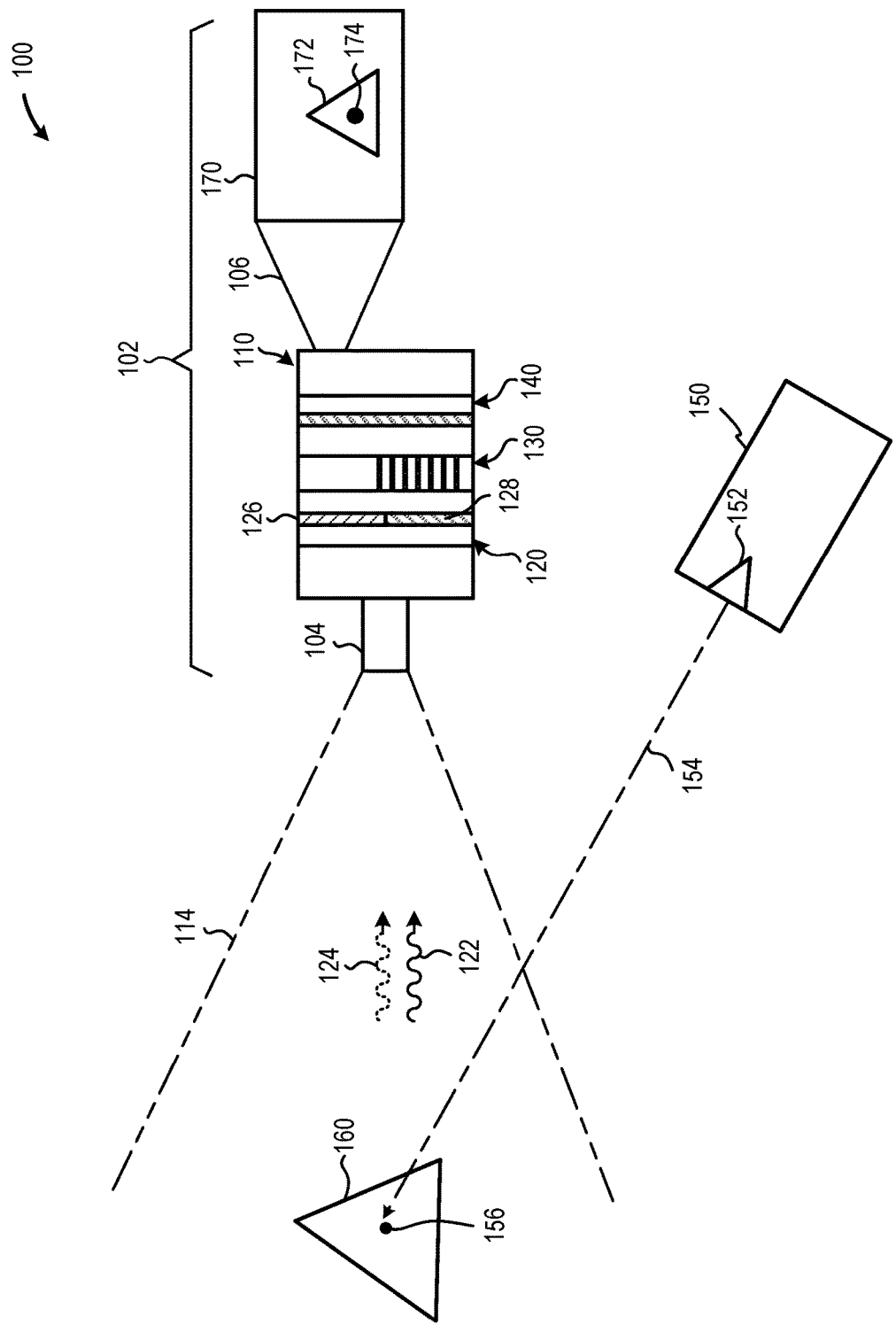
FIG. 1 depicts an illustrative dual-spectrum image intensification system that includes an enhanced vision system that incorporates a dual-spectrum image intensifier and a designator, in accordance with at least one embodiment described herein.

Although the following Detailed Description will proceed with reference being made to illustrative embodiments, many alternatives, modifications and variations thereof will be apparent to those skilled in the art.

DETAILED DESCRIPTION

The systems and methods described herein provide a dual-spectrum photocathode capable of providing image intensification in a first spectral band (e.g., the visible portion of the electromagnetic spectrum including electromagnetic energy having wavelengths of 390 nanometers (nm) to 700 nm) and in a second spectral band (e.g., the short wave infrared portion of the electromagnetic spectrum including electromagnetic energy having wavelengths above 900 nm). The second spectral band is different from the first spectral band. Such an image intensification device beneficially permits the use of SWIR designators that are visible to those individuals possessing the image intensification devices described herein.

A photocathode includes a substrate coated with one or more optoelectronic materials capable of emitting photo-electrons in response to an incident photons having an energy level greater than a defined band gap threshold associated with the optoelectronic material. The vacuum-emitting photocathodes disclosed in the systems and methods contained herein emit photo-electrons into a vacuum. One or more materials facilitating the departure of photo-electrons from the surface of the vacuum-emitting photo-cathode may be disposed across the surface of the optoelectronic material. Emitting photo-electrons into a vacuum assists in preventing oxidation and destruction of the optoelectronic materials disposed on the photocathode.

Physically, the one or more optoelectronic materials may be directly deposited on or otherwise transferred to a substrate. The substrate may provide an entrance window to the image intensifier. This substrate may include any number and/or combination of materials or substances that permit the passage of photons within a desired electromagnetic spectrum. Typical substrates include, but are not limited to: sapphire glass ($Al_2O_3$—passes electromagnetic energy have wavelengths between 150 nanometers and 5500 nanometers), magnesium fluoride ($MgF_2$—passes electromagnetic energy having wavelengths between 120 nanometers and 8000 nanometers), calcium fluoride ($CaF_2$—passes electromagnetic energy having wavelengths between 300 nanometers and 8000 nanometers), quartz ($SiO_2$—passes electromagnetic energy having wavelengths between 150 nanometers and 3500 nanometers) when the image intensifier is intended to operate within the visible light spectrum of 390 nanometers to 700 nanometers.

Quantum efficiency (QE) provides one way of characterizing the performance of an optoelectronic material. The QE of a material provides a qualitative measure of the number of photo-electrons emitted by the optoelectronic material divided by the number of incident photons, in that regard QE provides a measure of how efficiently the optoelectronic material converts incoming photons to photo-electrons. An Indium-Gallium Arsenide Phosphide (InGaAsP) based photodiode provides a QE of about 1% to 1.5% across an electromagnetic spectrum spanning 300 nanometers (nm) to about 1600 nm, providing the capability of detecting SWIR electromagnetic energy. To enhance image intensifier performance at lower (i.e., visible) wavelengths, different optoelectronic materials may be used. For example, an Indium-Gallium-Phosphide (InGaP)-based optoelectronic material may provide a QE of up to 85% in the visible electromagnetic spectrum. In another example, a Gallium-Arsenide (GaAs)-based optoelectronic material may provide a QE of up to 90% between electromagnetic wavelengths of 500 nanometers (nm) to 900 nm. In another example, a Gallium Arsenide Phosphide (GaAsP)-based optoelectronic material may provide a QE of up to 50% across the visible light spectrum. Each of these optoelectronic materials present a significant improvement over InGaAsP-based optoelectronic materials when used to intensify visible light images. Thus, to provide a high-resolution image of a scene, the enclosed systems and method employ a photocathode containing primarily InGaP, GaAs, and/or GaAsP-based optoelectronic materials to provide exceptional image intensification within the visible spectrum along with InGaAsP-based optoelectronic material to provide exceptional SWIR detection capabilities. Used together, a photocathode containing both an InGaP, GaAs, and/or GaAsP-based optoelectronic material to provide visible image intensification and an InGaAsP-based optoelectronic material to provide SWIR detection and intensification permit the use of SWIR designators that are undetectable by conventional CCD or CMOS image sensors while providing an exceptionally bright and high resolution visible spectrum image.

The systems and methods described herein provide a plurality of photocathode configurations using a first optoelectronic material that generates photo-electrons in response to incident electromagnetic energy (i.e., photons) in a first spectral band that includes the visible electromagnetic spectrum and a second optoelectronic material that generates photo-electrons in response to incident electromagnetic energy (i.e., photons) in a second spectral band, that is different from the first spectral band. Various photocathode optoelectronic material configurations are possible. In an example dual-spectrum photocathode, the first optoelectronic material may be disposed as a layer or film across all or a portion of a substrate and the second optoelectronic material may be patterned on and/or across the surface of the first optoelectronic material, resulting in a photocathode having multiple, stacked optoelectronic materials. In another example dual-spectrum photocathode, the first optoelectronic material may be patterned onto the substrate and the second optoelectronic material may be patterned onto the substrate in a complimentary pattern such that the second optoelectronic material is embedded or at least partially surrounded by the first optoelectronic material. In embodiments, the first optoelectronic material may include any number and/or combination of binary compounds (e.g., indium phosphide, InP; gallium arsenide, GaAs; silver oxide, $Ag_2O$; cobalt oxide, CoO; cuprous oxide, $Cu_2O$; gold oxide $Au_2O_3$; platinum oxide $PtO_2$), ternary compounds (e.g., indium gallium arsenide; InGaAs, silver oxide cesium, AgOCs; antimony oxide cesium, CsSbO) or quaternary compounds (e.g., indium gallium arsenide phosphide, InGaAsP, bismuth silver oxide cesium, BiAgOCs). The second optoelectronic material may include any number and/or combination of binary compounds (e.g., indium phosphide, InP; gallium arsenide, GaAs; silver oxide, $Ag_2O$; cobalt oxide, CoO; cuprous oxide, $Cu_2O$; gold oxide $Au_2O_3$; platinum oxide $PtO_2$), ternary compounds (e.g., indium gallium arsenide; InGaAs, silver oxide cesium, AgOCs; antimony oxide cesium, CsSbO) or quaternary compounds (e.g., indium gallium arsenide phosphide, InGaAsP, bismuth silver oxide cesium, BiAgOCs).

A dual-spectrum image intensifier is provided. The dual-spectrum image intensifier may include: a photocathode that includes: a first photodetector array that includes a first optoelectronic material to generate photo-electrons in response to incident photons in a first spectral band; and a second photodetector array that includes a second optoelectronic material to generate photo-electrons in response to incident photons in a second spectral band, the second spectral band different from the first spectral band; wherein the photo-electrons generated by both the first photodetector array and the second photodetector array are emitted into a vacuum space adjacent to at least a portion of the second photodetector array; and an electron multiplier separated from the photocathode by the vacuum space.

A dual-spectrum image intensifier fabrication method is provided. The method may include: depositing a first optoelectronic material on a first surface of a photocathode substrate disposed transverse to an optical axis of the dual-spectrum image intensifier such that at least a portion of incident photons pass through the photocathode substrate and the first optoelectronic material, the first optoelectronic material to generate photo-electrons responsive to incident photons in a first spectral band; depositing a second optoelectronic material on a surface such that at least a portion of the incoming photons pass through the second optoelectronic material, the second optoelectronic material to generate photo-electrons responsive to incident photons in a second spectral band, the second spectral band different from the first spectral band; depositing an electron multiplier along the optical axis of the dual-spectrum image intensifier the electron multiplier spaced apart from the photocathode substrate; and reducing absolute pressure in the space between the dual-spectrum image intensifier the electron multiplier to less than atmospheric pressure.

A dual-spectrum image intensification method is provided. The method may include: generating, by a photocathode, a first plurality of photo-electrons using a first optoelectronic material sensitive to incident photons in a first spectral band, the first optoelectronic material deposited on a first portion of a first surface of an image intensifier photocathode substrate; generating, by the photocathode, a second plurality of photo-electrons using a second optoelectronic material sensitive to incident photons in a second spectral band, the second optoelectronic material deposited on a second portion of the first surface of the image intensifier photocathode substrate, the second spectral band different from the first spectral band; ejecting the first plurality of photo-electrons and the second plurality of photo-electrons into a first vacuum space proximate the photocathode and between the photocathode and a microchannel plate; accelerating the first plurality of photo-electrons and the second plurality of photo-electrons through a first electric field in the first vacuum space; generating, by the microchannel plate, a plurality of secondary electrons, the plurality of secondary electrons generated by the impact of the first plurality of photo-electrons and the second plurality of photo-electrons on the microchannel plate; ejecting the plurality secondary electrons into a second vacuum space proximate the microchannel plate and between the microchannel plate and a phosphor screen; accelerating the plurality of secondary electrons through a second electric field in the second vacuum space; displaying, by the phosphor screen, an image created by the impact of the plurality of secondary electrons with the phosphor screen.

An enhanced vision system is provided. The system may include: an objective lens array; dual-spectrum image intensifier comprising: a photocathode that includes: a first photodetector array that includes a first optoelectronic material to generate photo-electrons in response to incident photons in a first spectral band; and a second photodetector array that includes a second optoelectronic material to generate photo-electrons in response to incident photons in a second spectral band, the second spectral band different from the first spectral band; wherein the photo-electrons generated by both the first photodetector array and the second photodetector array are emitted into a first vacuum space adjacent to at least a portion of the second photodetector array; and a microchannel plate to generate secondary electrons, the microchannel plate separated from the photocathode by the first vacuum space; wherein the secondary electrons generated by the microchannel plate are emitted into a second vacuum space adjacent to the microchannel plate; a phosphor screen to generate photons corresponding to an enhanced image responsive to incident secondary electrons, the phosphor screen separated from the microchannel plate by the second vacuum space; and an eyepiece lens array.

As used herein, the terms "top," "bottom," "up," "down," "upward," "downward," "upwardly," "downwardly" and similar directional terms should be understood in their relative and not absolute sense. Thus, a component described as being "upwardly displaced" may be considered "laterally displaced" if the device carrying the component is rotated 90 degrees and may be considered "downwardly displaced" if the device carrying the component is inverted. Such implementations should be considered as included within the scope of the present disclosure.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

As used herein, the term "visible electromagnetic spectrum" refers to the portion of the human-visible electromagnetic spectrum having wavelengths falling between approximately 390 nanometers (nm) and approximately 700 nm. Such electromagnetic radiation may be colloquially referred to as "visible light."

As used herein, the terms "near infrared," "near IR," and "NIR" refer to the portion of the electromagnetic spectrum having wavelengths falling between approximately 750 nm and approximately 1400 nm (1.4 μm).

As used herein, the terms "short wave infrared," "short-wave IR," and "SWIR" refer to the portion of the electromagnetic spectrum having wavelengths falling between approximately 900 nm and approximately 3000 nm (3 μm).

As used herein, the term "ultraviolet electromagnetic spectrum," and "UV electromagnetic spectrum" refer to a portion of the electromagnetic spectrum that includes one or more of: the UVA electromagnetic spectrum having wavelengths falling between approximately 315 nanometers (nm) and approximately 400 nm; the UVB electromagnetic spectrum having wavelengths falling between approximately 280 nm and approximately 315 nm; and/or the UVC electromagnetic spectrum having wavelengths falling between approximately 200 nm and approximately 280 nm.

As used herein, the term "array" may refer to a substance or material having at least one element. Stated differently, as used herein the term "array" may refer to an array containing one or more elements.

FIG. 1 depicts an illustrative dual-spectrum image intensification system 100 that includes an enhanced vision system 102 that incorporates a dual-spectrum image intensifier 110 and a designator 150, in accordance with at least one embodiment described herein. As depicted in FIG. 1, the enhanced vision system 102 receives photons reflected by an object 160 within the field of view 114 of the enhanced vision system 102. In embodiments, the photons may include photons 122 in a first spectral band (e.g., the visible portion between 390 nanometers (nm) and 700 nm) and photons 124 in a second spectral band (e.g., the SWIR spectrum between 900 nm and 1700 nm). The enhanced vision system 102 may include an objective lens array 104 to collect and focus photons 122 and photons 124 on the image intensifier photocathode 120. The enhanced vision system 102 may further include an eyepiece 106 to display an enhanced image 170 produced by the image intensifier 110. In embodiments, the enhanced image 170 may include an image containing one or more objects 172 emitting and/or reflecting photons 122 in the first spectral band and one or more objects 174 emitting and/or reflecting photons 124 in the second spectral band.

The image intensifier 110 includes at least a photocathode 120, a microchannel plate 130, and a phosphor screen 140. The photocathode 120 includes a first photodetector array 126 that uses at least one first optoelectronic material that generates photo-electrons in response to incoming photons 122 in the first spectral band and at least one second photodetector array 128 that uses a second optoelectronic material that generates phot0-electrons in response to incoming photons 124 in the second spectral band. In embodiments, the photocathode 120 may include any number of additional optoelectronic materials. In response to incoming photons 122 and 124, the photocathode 120 generates and/or emits photo-electrons that impinge, impact or otherwise strike a photomultiplier, such as the microchannel plate (MCP) 130. The impact of the photo-electrons with channel walls in the microchannel plate 130 generates tens, hundreds, or even thousands of secondary electrons. These secondary electrons generated in or by the microchannel plate 130 depart the surface of the microchannel plate 130 and impact the phosphor screen 140 where the energy of the secondary electrons is converted back to an intensified or enhanced photonic output having a wavelength based upon the material(s) used to form the phosphor layer.

The system user is able to view the enhanced image output from the phosphor screen 140 via eyepiece 106. The eyepiece 106 displays an intensified, image 170 in which contributions from both photons 122 in the first spectral band 172 and photons 124 in the second spectral band 174 are visible to the system user.

In embodiments, a designator 150 may include an emitter 152 that generates an electromagnetic output 154. In embodiments, the emitter 152 may produce an electromagnetic output 154 in the near infrared (NIR) electromagnetic spectrum (i.e., from about 700 nanometers (nm) to about 900 nm). In embodiments, the emitter 152 may produce an electromagnetic output 154 in the ultraviolet electromagnetic spectrum (i.e., less than 390 nanometers). In yet other embodiments, the emitter 152 may produce an electromagnetic output 154 in the short-wave infrared (SWIR) electromagnetic spectrum (i.e., from about 900 nanometers (nm) to about 1700 nm).

In some implementations, the designator 150 may include a handheld, portable device capable of designating or indicating objects, individuals, or other items that may be present in the field-of-view 114 of the enhanced vision system 102. In some implementations, the electromagnetic output 154 produced by the designator 150 may be invisible to the naked-eye, but visible when viewed through the image intensifier 110. In one example, the designator may place a "dot" 156 on an object 160. The "dot" 156 on the physical object may be in the SWIR electromagnetic spectrum and invisible to the naked-eye, however, the presence of the "dot" 156 on the object 160 may be visible as a dot 174 in the intensified image 170 provided by the image intensifier 110.

Figure 2:
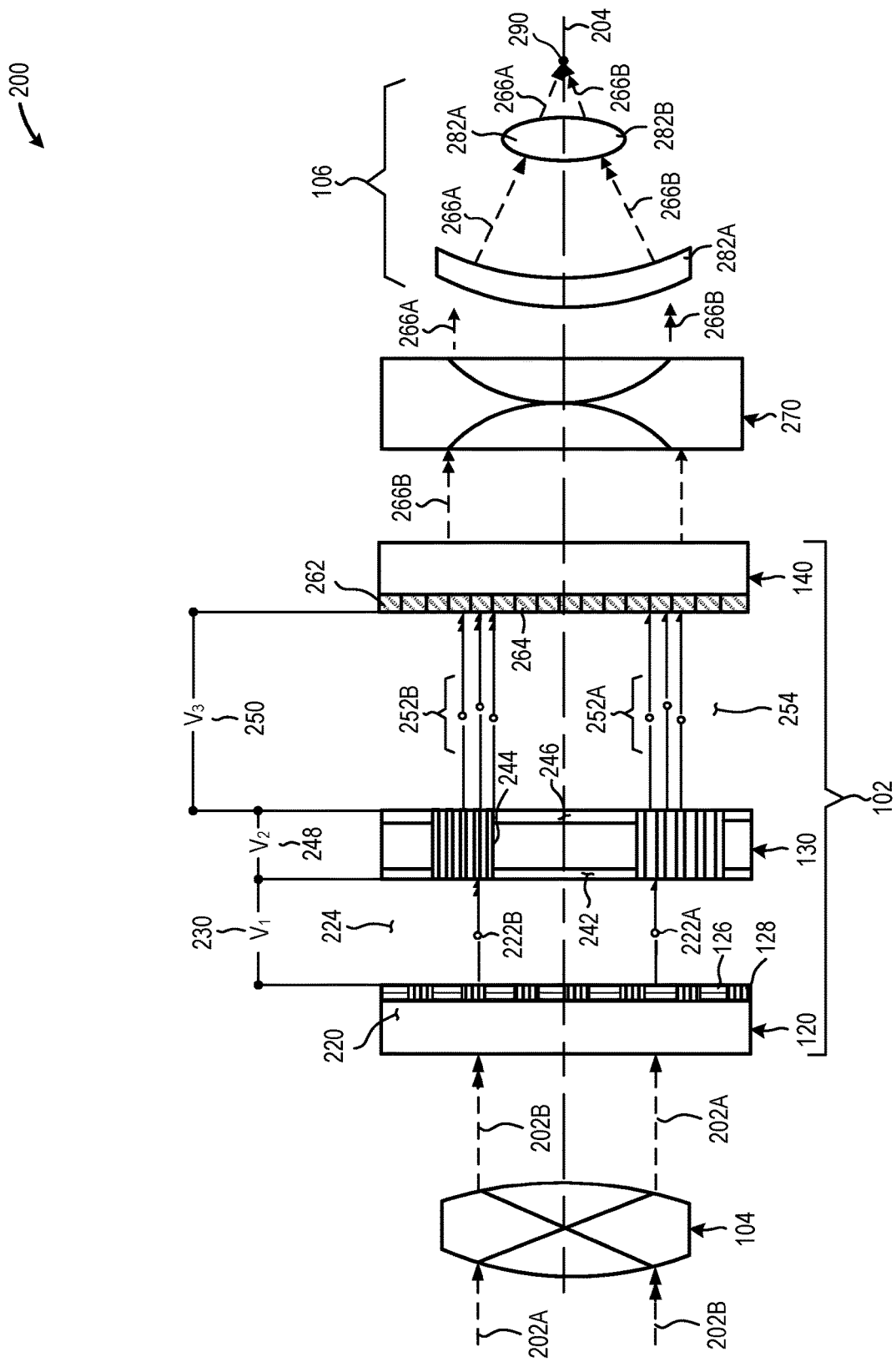
FIG. 2 is a cross-sectional elevation of an illustrative enhanced vision system that includes an image intensifier using a photocathode in which the first photodetector array and the second photodetector array are disposed on a common substrate, in accordance with at least one embodiment described herein.

FIG. 2 is a cross-sectional elevation of an illustrative enhanced vision system 200 that includes an image intensifier 110 using a photocathode 120 in which the first photodetector array 126 and the second photodetector array 128 are disposed on a common substrate 220, in accordance with at least one embodiment described herein. The enhanced vision system 200 includes an objective lens 104, the image intensifier 102, an image re-inverter 270, and an eyepiece 106, in accordance with at least one embodiment described herein. In embodiments, the objective lens 104, image intensifier 102, image re-inverter 270, and eyepiece 106 may be disposed on or along a common optical axis 204.

Ambient electromagnetic energy, for example photons 202A in a first spectral band and photons 202B in a second spectral band enter the objective lens 104 of the enhanced vision system 200. In embodiments, the objective lens 104 inverts the image and the photons 202A and 202B exit the objective lens 104. In embodiments, the objective lens 104 may include one or more simple or compound lenses. The objective lens 104 may be fabricated from one or more materials that include, but are not limited to, fiber-optic fibers, quartz ($SiO_2$), borosilicate glass, fused silica, sapphire glass ($Al_2O_3$), magnesium fluoride ($MgF_2$), calcium fluoride ($CaF_2$) and similar. The objective lens 104 may be transparent or semi-transparent to energy in at least a portion of the visible portion of the electromagnetic spectrum. The objective lens 104 may be transparent or semitransparent to energy in at least a portion of the near infrared (NIR) or short-wave infrared (SWIR) portion of the electromagnetic spectrum. The objective lens 104 may be transparent or semitransparent to energy in at least a portion of the near ultraviolet portion of the electromagnetic spectrum.

In embodiments, the objective lens 104 may include and/or incorporate one or more shutters or similar devices or systems capable of selectively limiting the amount of electromagnetic energy (i.e., photons 202A and/or 202B) entering the enhanced vision system 200. In some implementations, the one or more shutters may limit the amount of electromagnetic energy entering only a portion of the objective lens 104 (e.g., limiting the amount of electromagnetic energy produced by a street light, brightly lit indoor scene, or similar intense light source entering the objective lens). The one or more shutters may include a mechanical shutter, an electrochromic shutter, an electromechanical shutter, or any combination thereof. In embodiments, the one or more shutters may provide photochromic light limitation.

The photons 202A and 202B pass through the objective lens 104 and impinge upon the dual-spectrum photocathode 120. The dual-spectrum photocathode 120 selectively generates photo-electrons 222A and 222B in response to the impact of photons 202A and 202B having a sufficient energy level. As depicted in FIG. 2, the dual-spectrum photocathode 120 generates a first photo-electron 222A in response a photon 202A having sufficient energy impacting the first photodetector array 126. As depicted in FIG. 2, the dual-spectrum photocathode 120 generates a first photo-electron 222B in response a photon 202B having sufficient energy impacting the second photodetector array 128. In embodiments, the dual-spectrum photocathode 120 may be deposited on or across all or a portion of the objective lens 104. In such embodiments, the objective lens 104 may provide a substrate for the deposition of the dual-spectrum photocathode 120. In embodiments, the dual-spectrum photocathode 120 may be disposed on, about, or across at least a portion of an entrance window to the image intensifier 110.

In embodiments, the first photodetector array 126 may include any number and/or combination of binary compounds, ternary compounds, and/or quaternary compounds. Similarly, the second photodetector array 128 may include any number and/or combination of binary compounds, ternary compounds, and/or quaternary compounds. In embodiments, one or more binary, ternary, and/or quaternary optoelectronic compounds or materials may be disposed in, on, about, or across at least a portion of the first photodetector array 126 and/or the second photodetector array 128 as a layer or in a random or structured pattern. Example binary compounds useful for providing the first photodetector array 126 include, but are not limited to: indium phosphide, InP; gallium arsenide, GaAs; silver oxide, $Ag_2O$; cobalt oxide, CoO; cuprous oxide, $Cu_2O$; gold oxide $Au_2O_3$; and platinum oxide $PtO_2$. Example ternary compounds useful for providing the first photodetector array 126 include, but are not limited to: indium gallium arsenide, InGaAs; silver oxide cesium, AgOCs; and antimony oxide cesium, CsSbO. Example quaternary compounds useful for providing the first photodetector array 126 include, but are not limited to: indium gallium arsenide phosphide, InGaAsP; and bismuth silver oxide cesium, BiAgOCs.

The dual-spectrum photocathode 120 includes any number and/or combination of systems and/or devices capable of vacuum photoemission by emitting photo-electrons 222A, 222B into the vacuum space 224 that separates the dual-spectrum photodetector 120 from the microchannel plate 130. The dual-spectrum photocathode 120 may include any number and/or combination of structures and/or materials capable of providing vacuum emitting photo-electrons 222. The dual-spectrum photocathode includes a first photodetector array 126 formed using at least one first optoelectronic material capable of generating photo-electrons 222A in response to the impact of incident electromagnetic energy and/or photons 202A in the first electromagnetic spectrum. The dual-spectrum photocathode 120 further includes a second photodetector array 128 formed using at least one second optoelectronic material 128 capable of generating photo-electrons 222B in response to the impact of incident electromagnetic energy and/or photons 202B in the second electromagnetic spectrum. Although only two optoelectronic materials are depicted as layered or patterned in FIG. 2 for ease of discussion and conciseness, one of ordinary skill in the relevant arts will appreciate that any number of layers of optoelectronic materials and/or any number of patterned optoelectronic materials may be similarly layered or patterned to provide the dual-spectrum photocathode 120—such embodiments should be considered as falling within the scope of this disclosure.

The first optoelectronic material that forms the first photodetector array 126 may be deposited, patterned, or otherwise formed as uniform layer or in a random or uniform pattern. The second optoelectronic material that forms the second photodetector array 128 may be deposited, patterned, or otherwise formed as uniform layer or in a random, uniform, or non-uniform pattern. In embodiments, either of the first optoelectronic material or the second optoelectronic material may be disposed proximate the substrate 220. In embodiments, the first optoelectronic material and the second optoelectronic material may have similar lattice geometries and/or crystalline structures to facilitate the passage of photo-electrons 222A, 222B through the dual-spectrum photocathode 120. One or more coatings or layers (not depicted in FIG. 2), such as an atomic layer of cesium oxide ($Cs_xO$), may be deposited, patterned, or otherwise applied to the dual-spectrum photocathode 120 to facilitate the departure of photo-electrons 222A, 222B from the dual-spectrum photocathode 120 and into the first vacuum space 224.

The first optoelectronic material may include one or more ternary materials, one or more quaternary materials, or any combination thereof. In embodiments, the ratio of one or more ternary or quaternary constituents may be adjusted or altered to adjust the absorption spectra of the first optoelectronic material. For example, the first optoelectronic material may include, but is not limited to, one or more materials containing: indium phosphide (InP), indium-gallium phosphide (InGaP), gallium arsenide (GaAs), gallium nitride (GaN), and/or gallium-arsenide phosphide (GaAsP). In embodiments, the composition of the first optoelectronic material may be adjusted based, at least in part, on a desired photon absorption range. In some embodiments, the first optoelectronic material may be applied, patterned, formed, or otherwise disposed on, across, or about all or a portion of the surface of the substrate 220. In some embodiments, the first optoelectronic material may be patterned, formed, or otherwise deposited on a transfer medium. The transfer medium carrying the first optoelectronic material may be applied to the substrate 220 or the second optoelectronic material and removed, leaving the first optoelectronic material behind. In some embodiments, the first optoelectronic material may be applied, patterned, formed, or otherwise disposed on, across, or about all or a portion of the surface of the second optoelectronic material.

The first optoelectronic material may have a uniform or non-uniform composition. The first optoelectronic material may have a uniform or non-uniform thickness. In some embodiments, the first optoelectronic material may have a thickness based, at least in part, on a mean free path length for a photo-electron to escape or otherwise pass through the first optoelectronic material. In embodiments, the thickness of the first optoelectronic material may be selected to provide a desired absorption spectrum. The first optoelectronic material may have a thickness of: about 0.01 micrometers (μm) to about 1 μm; about 0.01 μm to about 5 μm; about 0.01 μm to about 10 μm; or about 0.01 μm to about 20 μm.

The second optoelectronic material may include one or more binary compounds, one or more ternary compounds, one or more quaternary compounds, or combinations thereof. Example binary compounds useful for providing the second photodetector array 128 include, but are not limited to: indium phosphide, InP; gallium arsenide, GaAs; silver oxide, $Ag_2O$; cobalt oxide, CoO; cuprous oxide, $Cu_2O$; gold oxide $Au_2O_3$; and platinum oxide $PtO_2$. Example ternary compounds useful for providing the second photodetector array 128 include, but are not limited to: indium gallium arsenide, InGaAs; silver oxide cesium, AgOCs; and antimony oxide cesium, CsSbO. Example quaternary compounds useful for providing the second photodetector array 128 include, but are not limited to: indium gallium arsenide phosphide, InGaAsP; and bismuth silver oxide cesium, BiAgOCs.

In embodiments, the ratio of one or more binary, ternary, and/or quaternary constituent compounds included forming the second optoelectronic material may be adjusted or altered to adjust the absorption spectra of the material. In embodiments, the composition of the second optoelectronic material may be adjusted based, at least in part, on a desired photon absorption range. For example, the first optoelectronic material may be sensitive to incoming photons 202A in a first portion of the electromagnetic spectrum while the second optoelectronic material may be sensitive to incoming photons 202B in a second spectral band. In embodiments, the second spectral band may be different than the first spectral band. In other embodiments, the second spectral band may partially overlap the first spectral band. In yet other embodiments, the second spectral band may completely overlap the first spectral band.

In some embodiments, the second optoelectronic material may be applied, patterned, formed, or otherwise disposed on, across, or about all or a portion of the surface of the substrate 220. In some embodiments, the second optoelectronic material may be applied, patterned, formed, or otherwise disposed on, across, or about all or a portion of the surface of the first optoelectronic material. In some embodiments, the second optoelectronic material may be patterned, formed, or otherwise deposited on a transfer medium. The transfer medium carrying the second optoelectronic material may be disposed on or otherwise applied to the substrate 220 or the first optoelectronic material and removed, leaving the second optoelectronic material behind.

The second optoelectronic material may have a uniform or non-uniform composition. The second optoelectronic material may have a uniform or non-uniform thickness. In some embodiments, the second optoelectronic material may have a thickness based, at least in part, on a mean fee path length for a photo-electron 222A, 222B to escape or otherwise pass through the second optoelectronic material. In embodiments, the thickness of the second optoelectronic material may be selected to provide a desired absorption spectrum. The second optoelectronic material may have a thickness of: about 0.01 micrometers (μm) to about 1 μm; about 0.01 μm to about 5 μm; about 0.01 μm to about 10 μm; or about 0.01 μm to about 20 μm.

In embodiments, an interposer layer that includes one or more electrically conductive materials may be deposited between the first optoelectronic material layer and the second optoelectronic material layer. In other embodiments, an interposer layer that includes one or more dielectric materials may be deposited between the first optoelectronic material layer and the second optoelectronic material layer.

In other embodiments, the at least one first optoelectronic material and the second optoelectronic material may both be patterned on the substrate 220 such that the first optoelectronic material forming the first photodetector array 126 does not overlap the second optoelectronic material forming the second photodetector array 128. Such patterns may include checkerboard patterns, circular patterns, swirled patterns, and similar. In some embodiments, some or all of the elements forming the first photodetector array 126 may be disposed proximate some or all of the elements forming the second photodetector array 128 such that the elements are in physical contact with each other. In some embodiments, some or all of the elements forming the first photodetector array 126 may be spaced apart from some or all of the elements forming the second photodetector array 128, leaving a gap between neighboring elements. In some embodiments, some or all of the elements forming the first photodetector array 126 may be spaced apart from some or all of the elements forming the second photodetector array 128, and an interposer layer that includes one or more conductive materials may be deposited in a gap formed between neighboring elements. In some embodiments, some or all of the elements forming the first photodetector array 126 may be spaced apart from some or all of the elements forming the second photodetector array 128, and an interposer layer that includes one or more dielectric materials may be deposited in a gap formed between neighboring elements In embodiments, the at least one first optoelectronic material and the at least one second optoelectronic material may both be patterned on the substrate 220 such that some or all of the elements forming the second photodetector array 128 are disposed in, on, about, across, or at least partially embedded in the first photodetector array 126. The elements forming the second photodetector array 128 may be disposed in, on, or about the first photodetector array 126 using any random, abstract, regular, or irregular pattern. For example, the elements forming the second photodetector array 128 may be formed in one or more of: a checkerboard pattern, a circular pattern, a swirled pattern, or similar. In some embodiments, some or all of the elements forming the second photodetector array 128 may be embedded proximate the first photodetector array 126 such that the elements of the second photodetector array 128 physically contact the first photodetector array 126. In some embodiments, an interposer layer that includes one or more electrically conductive materials may be disposed between some or all of the elements forming the second photodetector array 128 and the first photodetector array 126. In some embodiments, an interposer layer that includes one or more dielectric materials may be disposed between some or all of the elements forming the second photodetector array 128 and the first photodetector array 126. Such interposer layers may include a layer disposed horizontally or vertically.

In other embodiments, one of either the first optoelectronic material or the second optoelectronic material may be may be deposited as a layer or film on, about, or across the surface of the substrate 220 and the other optoelectronic material may be patterned on the surface of the deposited optoelectronic material such that a plurality of stacked optoelectronic material layers cover at least a portion of the substrate 220. The patterned optoelectronic material elements may be disposed in, on, or about the first photodetector array 126 using any random, abstract, regular, or irregular pattern. For example, the second optoelectronic material that forms a plurality of elements included in the second photodetector array 128 may be disposed in one or more of: a checkerboard pattern, a circular pattern, a swirled pattern, or similar. In some embodiments, some or all of the plurality of elements forming the second photodetector array 128 may disposed proximate the surface of the first photodetector array 126 such that the plurality of elements of the second photodetector array 128 physically contact the first photodetector array 126. In some embodiments, an interposer layer that includes one or more electrically conductive materials may be disposed between some or all of the elements forming the second photodetector array 128 and the first photodetector array 126. In some embodiments, an interposer layer that includes one or more dielectric materials may be disposed between some or all of the elements forming the second photodetector array 128 and the first photodetector array 126.

The substrate 220 may include one or more carbides, one or more oxides, or combinations thereof. In some embodiments, the material(s) used to provide the substrate 220 may be selected such that the lattice structure of the substrate 220 closely matches the lattice structure of the material(s) used to form either or both the first photodetector array 126 and/or the second photodetector array 128. For example, in some embodiments, the substrate 220 may include: magnesium fluoride ($MgF_2$); calcium fluoride ($CaF_2$); silicon carbide (SiC); quartz ($SiO_2$); or sapphire glass ($Al_2O_3$). In at least some embodiments, the substrate 220 may include all or a portion of the entrance window of the image intensifier 102.

The dual-spectrum photocathode 120 and the microchannel plate 130 are physically separated by a first vacuum space 224 maintained at a pressure below atmospheric pressure. In embodiments, the first vacuum space 224 may be maintained at a vacuum. A first potential difference (voltage $V_1$) 230 is applied across the dual-spectrum photocathode 120 and a first electrode 242 on the surface of the microchannel plate 130 nearest the dual-spectrum photocathode 120. The first potential difference 230 may be maintained at a voltage of from about 100 Volts to about 1200 Volts. Maintaining the first potential difference 230 between the dual-spectrum photocathode 120 and the first electrode 242 creates an electric field in the vacuum space 224 that separates the photocathode 120 and the first electrode 142. The electric field in the vacuum space 224 assists in causing the photo-electrons 222A and 222B to depart the surface of the dual-spectrum photocathode 120 into the vacuum space 224 and accelerate through the vacuum space 224 towards the first electrode 242 disposed on the surface of the microchannel plate 130.

The microchannel plate 130 includes the first electrode 242 disposed on the surface of the microchannel plate 130 nearest the dual-spectrum photocathode 120 and a second electrode 246 disposed on the surface of the microchannel plate 130 nearest the phosphor screen 140. The first electrode 242 and the second electrode 246 are maintained at different voltages, creating a second potential difference (second voltage $V_2$) 248. The second potential difference 248 may be maintained at a voltage of from about 400 Volts to about 1200 Volts.

A plurality of microchannels 244 extend through the microchannel plate 130. The microchannels 244 may have a diameter of from about 3 micrometers (μm) to about 25 μm. The microchannels 244 may be on a pitch (i.e., center-to-center distance) of from about 4 micrometers (μm) to about 32 μm. In some embodiments, the microchannels 244 may extend normally (i.e., at a 90° angle with respect to the surface of the microchannel plate 130) through the microchannel plate 130. In some embodiments, the microchannels 244 may extend at an angle (i.e., at less than a 90° angle with respect to the surface of the microchannel plate 130) through the microchannel plate 130.

The photo-electrons 222A and 222B emitted by the dual-spectrum photocathode 120 enter microchannels 244 formed in the microchannel plate 130. As the photo-electrons 202A and 202B travel through the microchannels 244 and impact the interior walls of the channel, secondary electrons are generated. At least some of the secondary electrons further impact the interior wall of the microchannel 244 causing the generation and emission of additional secondary electrons 252A and 252B (collectively, "secondary electrons 252"). The impact of the photo-electrons 222A and 222B emitted by the photocathode 120 thus cause the generation of tens, hundreds, or even thousands of secondary electrons 252, at least a portion of which exit the microchannel plate 130.

The secondary electrons 252 exiting the microchannel plate 130 pass through a second vacuum space 254 and impact the phosphor screen 140. In embodiments, a third potential difference (voltage $V_3$) 250 creates an electric field in the second vacuum space 254 that accelerates the secondary electrons 252 toward the phosphor screen 140. The phosphor screen 140 includes a phosphor layer 262 and a conductive layer 264. In embodiments, the third potential difference 250 is applied across the second electrode 246 on the surface of the microchannel plate 130 and the conductive layer 264 disposed on the phosphor screen 140. The third potential difference 250 may be maintained at a voltage of from about 2500 Volts to about 6000 Volts.

The electric field in the second vacuum space 254 causes the secondary electrons 252 to accelerate toward the phosphor layer 262 of the phosphor screen 140. The impact of the secondary photo-electrons 252 on the phosphor layer 262 causes the emission of photons 266A and 266B (collectively, "photons 266"). In embodiments, photons 266A and 266B which correspond to original photons 202A and 202B, respectively. Due to the multiplier effect of the microchannel plate 130, a single incident photon 202 may result in the generation of hundreds or even thousands of photons 266 by the phosphor screen 140. In embodiments, the photons 266A and 266B emitted by the phosphor layer 262 may be at a wavelength based, at least in part on the compound(s) included in and/or forming the phosphor layer 262. In embodiments, the phosphor layer 262 may include a yttrium-oxysulfide ($Y_2O_2S$) based phosphor. In some implementations, the yttrium-oxysulfide forming all or a portion of the phosphor layer 262 may include one or more rare earth dopants. For example, the phosphor layer 262 may include a $Y_2O_2S$-based phosphor doped with one or more rare earth dopants, such as elemental europium (Atomic Number 63—$Y_2O_2S$:Eu) and/or elemental terbium (Tb) (e.g. a P45 phosphor—$Y_2O_2S$:Tb).

In other embodiments, the phosphor layer 262 may include a gadolinium-oxysulfide ($Gd_2O_2S$) based phosphor. In some implementations, the gadolinium-oxysulfide forming all or a portion of the phosphor layer 262 may include one or more rare earth dopants. For example, the phosphor layer 262 may include a $Gd_2O_2S$-based phosphor doped with one or more rare earth dopants, such as elemental terbium (Tb) (e.g. a P43 phosphor—$Gd_2O_2S$:Tb).

The conductive layer 264 may be deposited on, about, or across all or a portion of the phosphor layer 262. The conductive layer 264 may provide an earth or chassis ground to drain the accumulated electrical charge from the flow of secondary electrons 252A, 252B from the phosphor layer 262. The conductive layer 264 may include one or more electrically conductive metals or metal alloys such as aluminum, silver, platinum, and the like. The conductive layer 264 may be disposed across all or a portion of the phosphor layer 262 using one or more currently available or future developed thin-layer deposition techniques. In embodiments, the use of yttrium-oxysulfide based compounds in the phosphor layer 262 beneficially provides a crystalline structure and/or surface morphology that facilitates efficient removal of accumulated charge using a thin conductive layer 264. Such represents a significant cost and performance advantage over other compounds used to provide the phosphor layer 262.

The image emitted by the phosphor screen 140 is inverted. The image re-inverter 270 re-inverts the image formed by the photons 266A, 266B emitted by the phosphor layer 262 such that the enhanced vision system 200 presents an image in the correct orientation (i.e., right side up) to the system user. Although not depicted in FIG. 2, In some implementations, all or a portion of the phosphor layer 262 may be deposited directly on or across the image re-inverter 270. In one embodiment, the image re-inverter 270 may include, but is not limited to, a plurality of twisted fiber-optic elements and the phosphor layer 262 may be deposited directly on an inlet end of at least some of the plurality of fiber-optic elements forming the image re-inverter 270.

The image-re-inverter 270 can include any number and/or combination of active and/or passive devices and/or systems capable of inverting the image provided by the phosphor screen 140. In implementations, the image re-inverter 270 may include any number and/or combination of prisms, mirrors, lenses or similar passive optics. In other implementations, the image re-inverter 270 may include a fiber-optic bundle that is twisted through an arc of 180°. The photons 266, now correctly displayed as a "right side up" image 170, are presented to the system user via the eyepiece 106.

The eyepiece 106 focuses the image provided by the phosphor screen 140 on a focal plane 290 that corresponds to the system user's eye. The eyepiece 106 may include one or more simple or compound lenses 282A and 282B (collectively, "lenses 282"). In some implementations, the eyepiece 106 may be adjustable to focus on a variable focal plane 290.

Figure 3A:
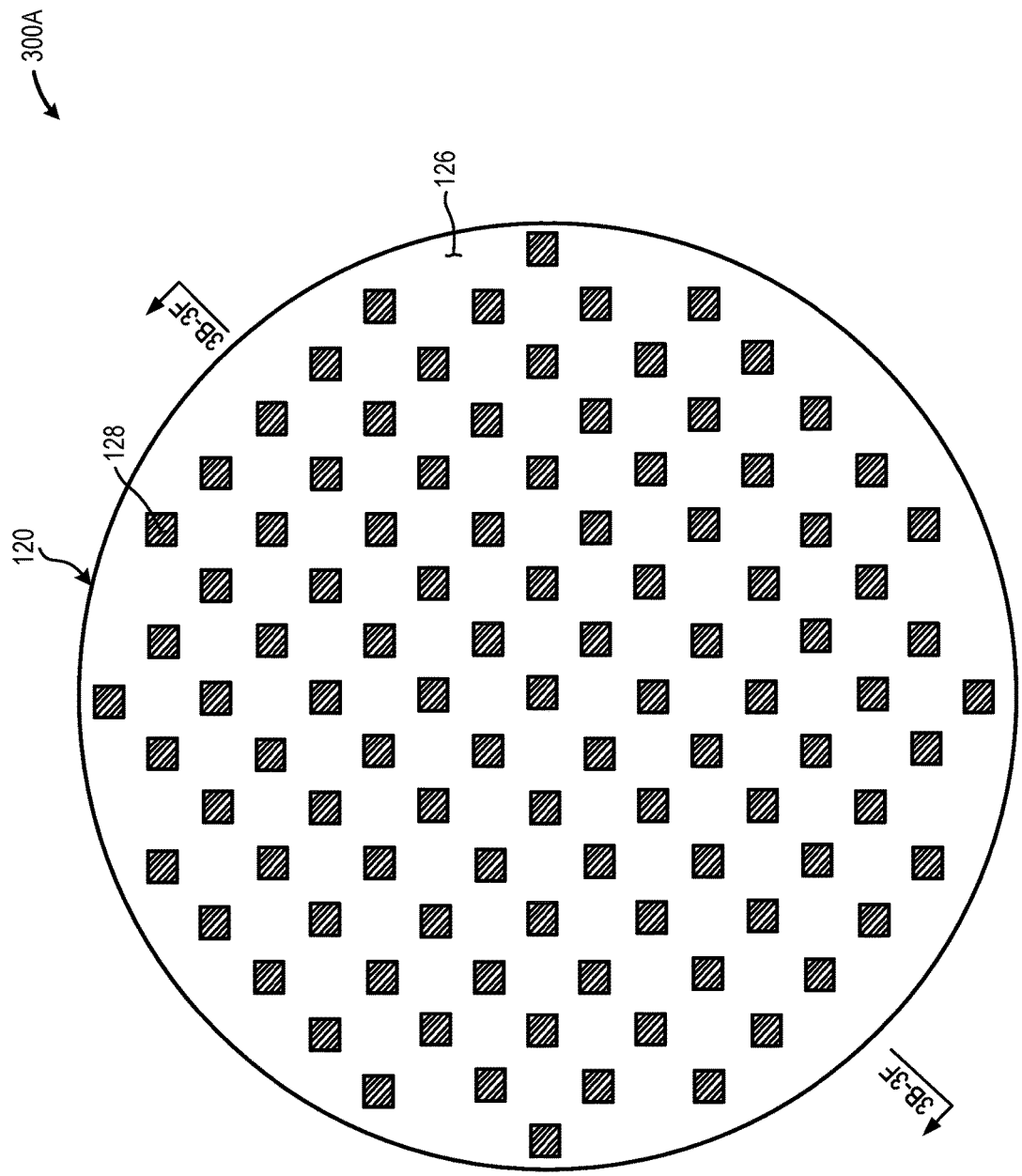
FIG. 3A is a plan view of an illustrative dual-spectrum photocathode in which a first optoelectronic material and a second optoelectronic material are deposited on a dual-spectrum photocathode substrate, in accordance with at least one embodiment described herein.
Figure 3B:
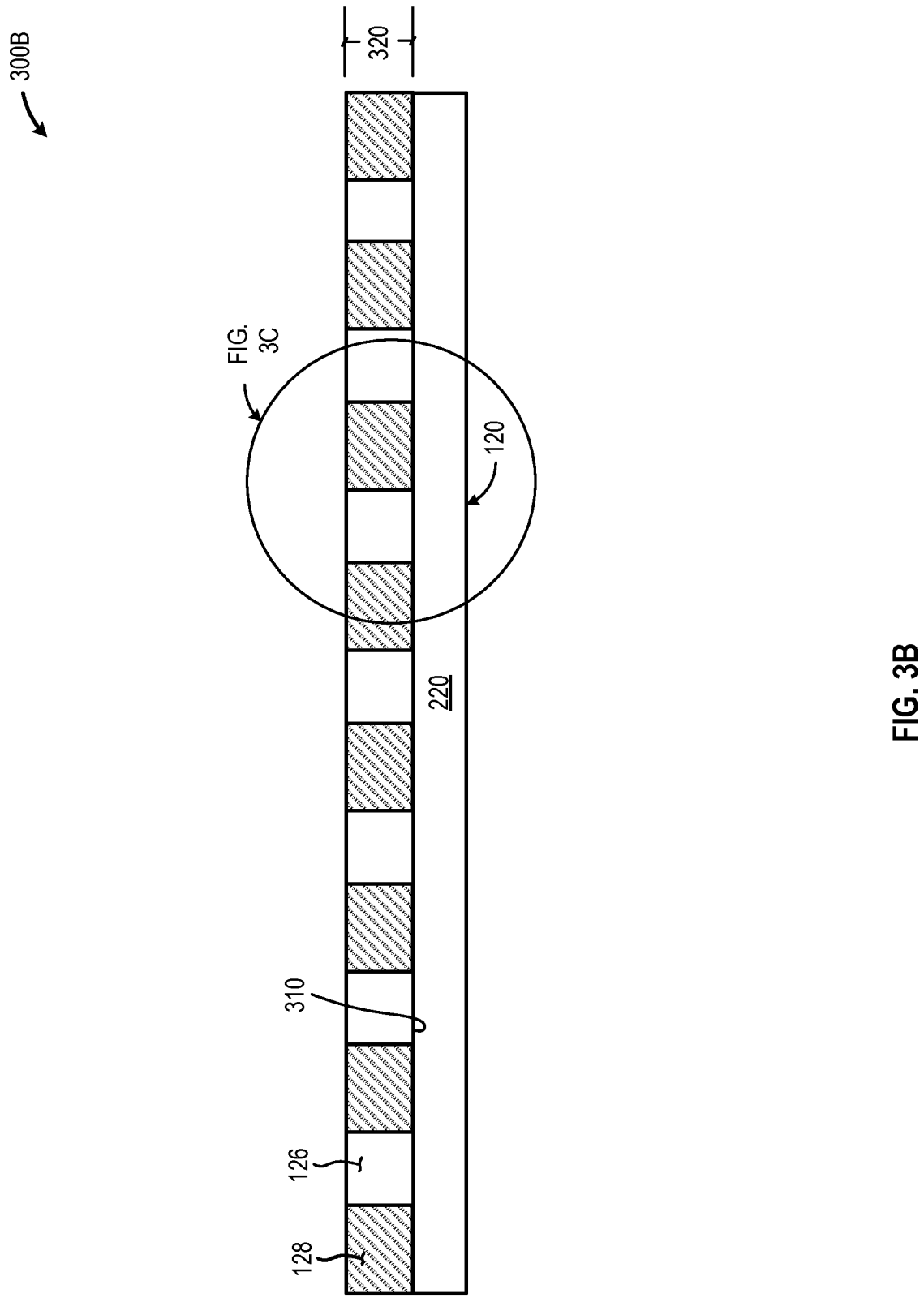
FIG. 3B is a partial cross-sectional elevation of the illustrative dual-spectrum photocathode depicted in FIG. 3A along sectional line 3B-3B, in accordance with at least one embodiment described herein.
Figure 3C:
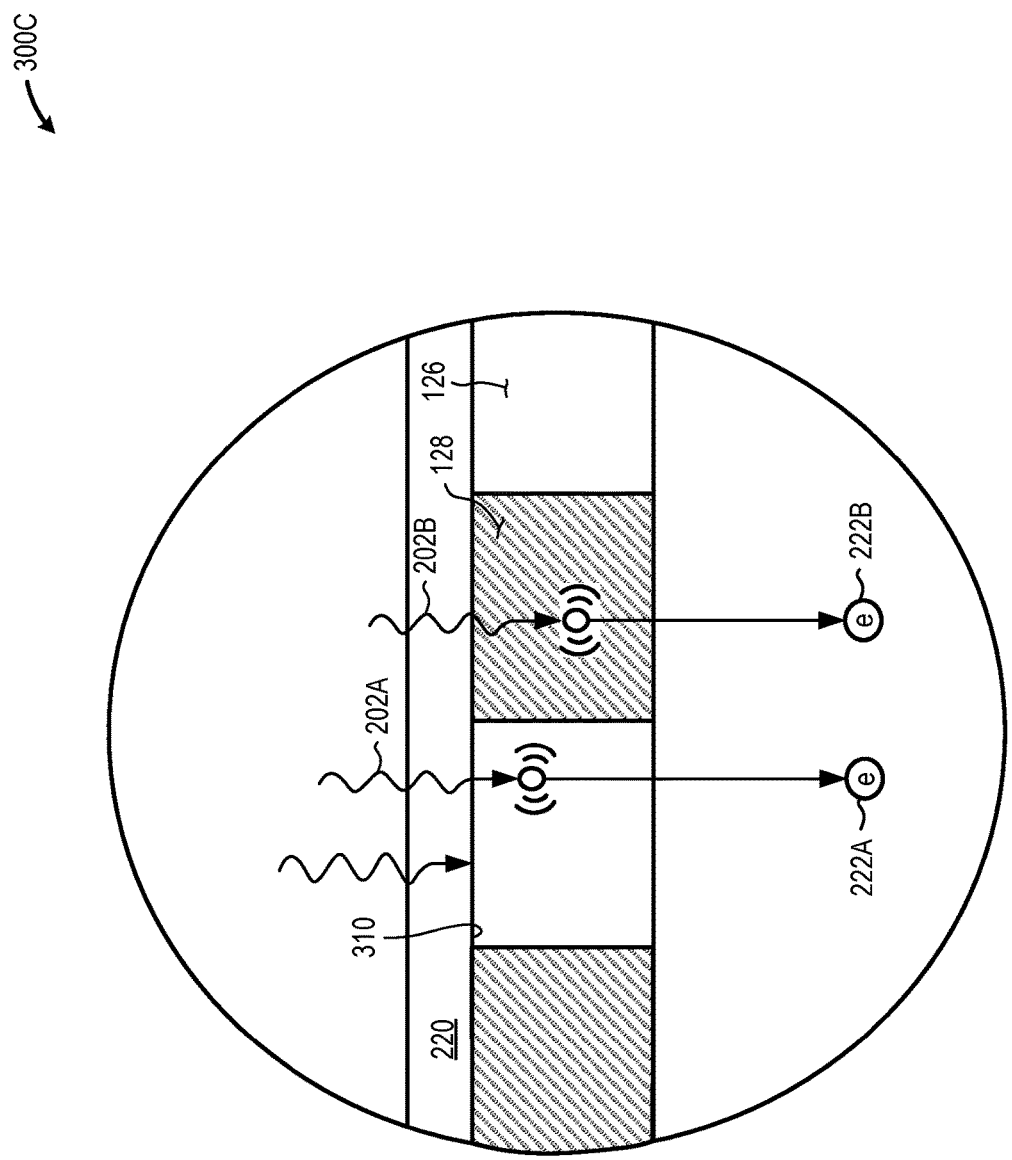
FIG. 3C is an expanded cross-sectional elevation of the illustrative dual-spectrum photocathode depicted in FIG. 3B that depicts the emission of one or more photo-electrons from the dual-spectrum photocathode, in accordance with at least one embodiment described herein.
Figure 3D:
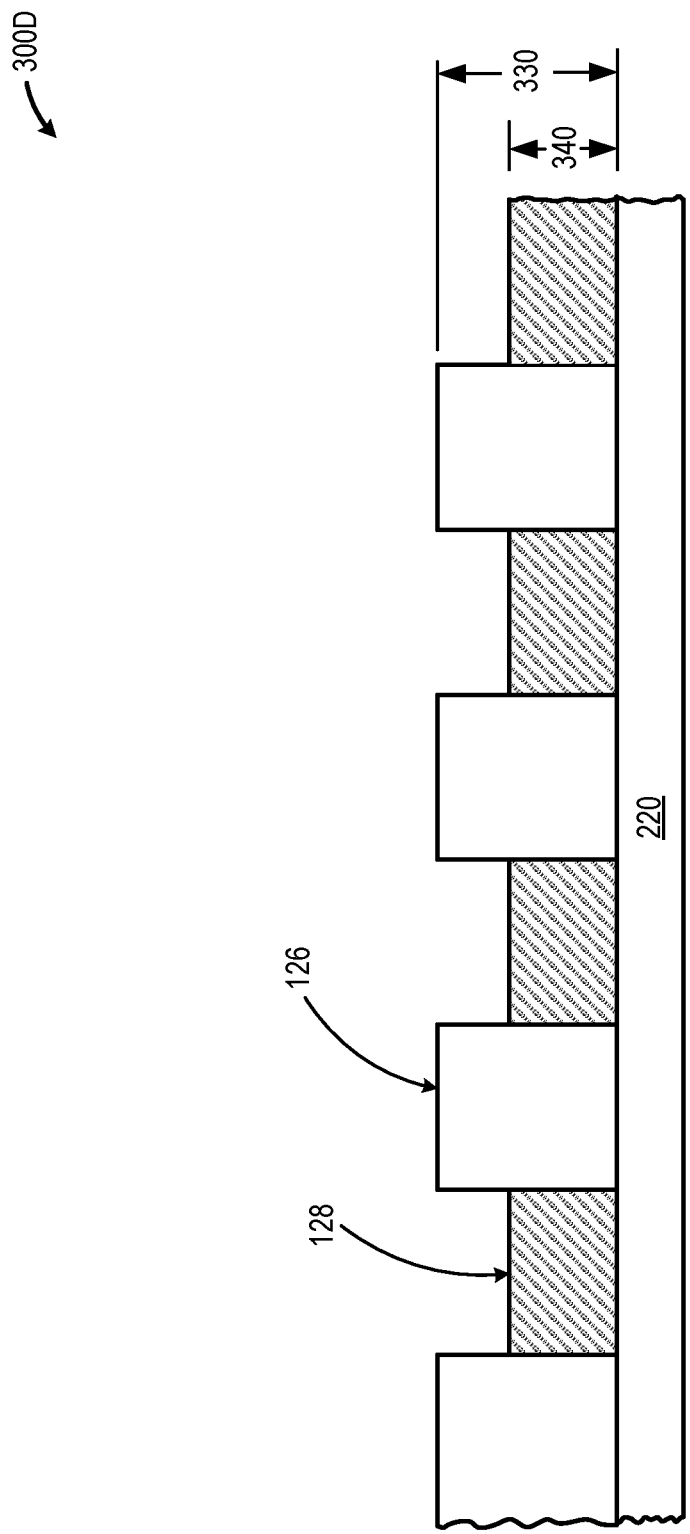
FIG. 3D is a partial cross-sectional elevation of the illustrative dual-spectrum photocathode depicted in FIG. 3A along sectional line 3D-3D, in accordance with at least one embodiment described herein.
Figure 3E:
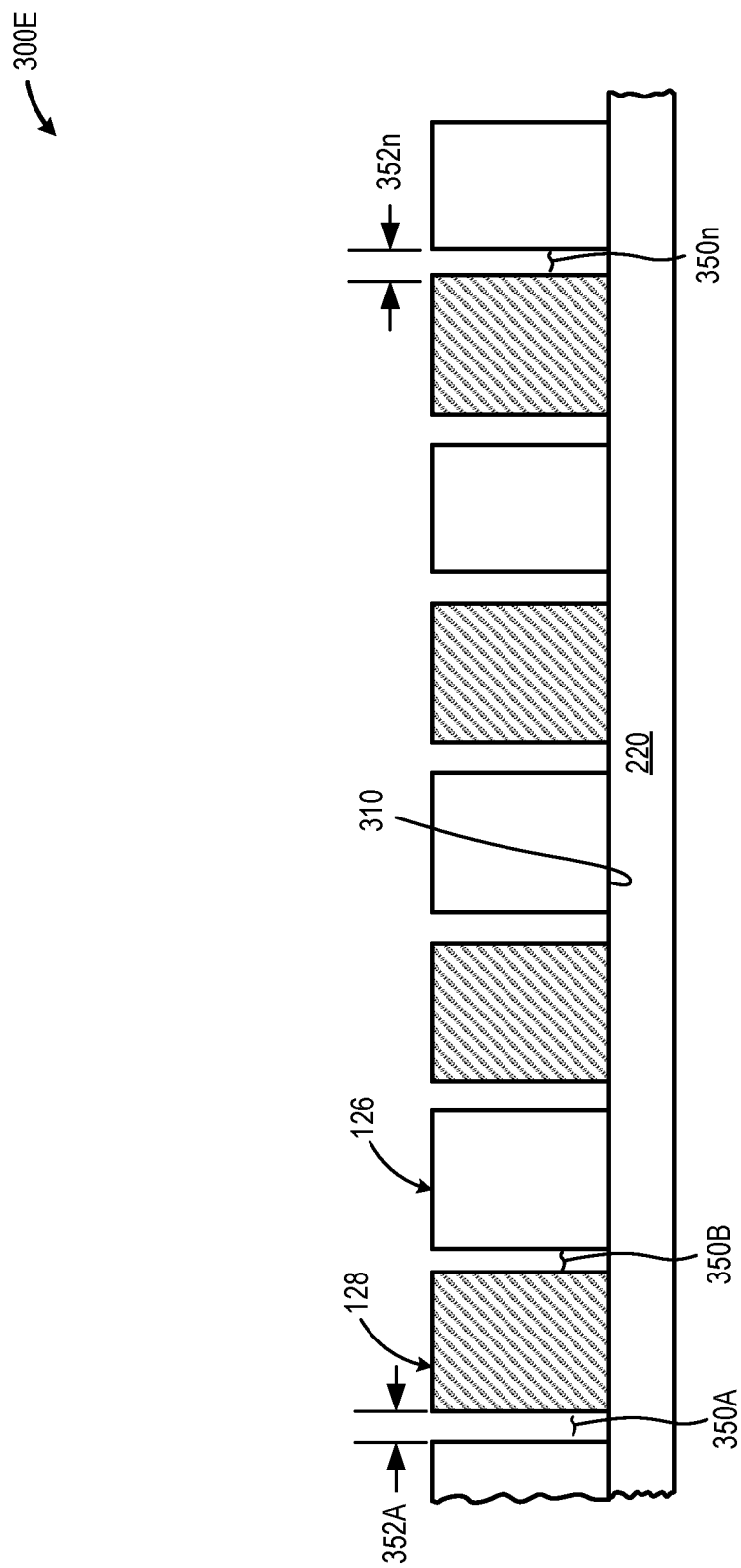
FIG. 3E is a partial cross-sectional elevation of the illustrative dual-spectrum photocathode depicted in FIG. 3A along sectional line 3E-3E, in accordance with at least one embodiment described herein.

FIG. 3A is a plan view of an illustrative dual-spectrum photocathode 120 in which a first optoelectronic material and a second optoelectronic material are deposited on a dual-spectrum photocathode substrate 220, in accordance with at least one embodiment described herein. FIG. 3B is a cross-sectional elevation of the illustrative dual-spectrum photocathode 120 depicted in FIG. 3A in which a first photodetector array 126 and a second photodetector array 128 are patterned onto a substrate 220, in accordance with at least one embodiment described herein. FIG. 3C is an expanded cross-sectional elevation of the illustrative dual-spectrum photocathode 120 depicted in FIG. 3B that depicts the emission of one or more photo-electrons 222A, 222B from the dual-spectrum photocathode 120, in accordance with at least one embodiment described herein. FIG. 3D is a cross-sectional elevation of the illustrative dual-spectrum photocathode 120 depicted in FIG. 3A in which a first photodetector array 126 having a first thickness 310 and a second photodetector array 128 having a different second thickness 320 are patterned onto a substrate 220, in accordance with at least one embodiment described herein. FIG. 3E is a cross-sectional elevation of the illustrative dual-spectrum photocathode 120 depicted in FIG. 3A in which gaps 330A-330*n* (collectively "gaps 330") separate the elements included in a first photodetector array 126 from elements included in a second photodetector array 128, in accordance with at least one embodiment described herein. FIG. 3E is a cross-sectional elevation of the illustrative dual-spectrum photocathode 120 depicted in FIGS. 3A and 3E in which a material 340A-340*n* is deposited in each of the gaps 330 that separate the elements included in a first photodetector array 126 from elements included in a second photodetector array 128, in accordance with at least one embodiment described herein.

As depicted in FIG. 3A, the physical geometry of the dual-mode photocathode substrate 220 defines a surface area across which the first optoelectronic material and the second optoelectronic material are deposited. In embodiments, the dual-mode photocathode substrate 220 may be a separate member disposed in the enhanced vision system 100. In other embodiments, the dual-mode photocathode substrate 220 may include a portion of one or more surfaces of the entrance window to the image intensifier 102.

In embodiments where the first photodetector array 126 and the second photodetector array 128 are disposed on the substrate 220, such as depicted FIG. 3B, the first photodetector array 126 may be disposed across: about 10% or more; about 20% or more; about 30% or more; about 40% or more; about 50% or more; about 60% or more; about 70% or more; about 80% or more; or about 90% or more of the surface area of the substrate 220. In embodiments where the first photodetector array 126 and the second photodetector array 128 are disposed on the dual-mode photocathode substrate 220, such as depicted FIG. 3B, the second photodetector array 128 may be disposed across: about 10% or less; about 20% or less; about 30% or less; about 40% or less; about 50% or less; about 60% or less; about 70% or less; about 80% or less; or about 90% or less of the surface area of the substrate 220.

Although the second photodetector array 128 is depicted in FIG. 3A as disposed in a regular pattern across the upper surface 310 of the substrate 220, the individual elements forming the second photodetector array 128 may be disposed in any random or structured pattern (e.g., triangular pitch, circles, ellipses, spirals, or pseudo-random patterning). For example, in some embodiments, the individual elements forming the second photodetector array 128 may be concentrated in a limited portion of the upper surface 310 of the substrate 220 to provide dual-spectrum enhanced vision capabilities in only a portion of the dual-spectrum photodetector 120. In another embodiment, the thicknesses of each of the individual elements forming the second photodetector array 128 may vary to provide differing levels of sensitivity to incoming photons 202B in the second spectral band. In yet another example, the second photodetector array 128 may include a single element disposed across a portion of the surface 310 of the substrate 220.

Referring now to FIG. 3B, in embodiments where the first optoelectronic material and the second optoelectronic material are patterned or otherwise disposed on the upper surface 310 of the substrate 220, the thickness 320 of the first photodetector array 126 may be adjusted to provide different incident light absorption characteristics (e.g., band gap) and photo-electron generation. After patterning on, across, or about the upper surface 310 of the substrate 220, the first photodetector array 126 may have a thickness 320 of: about 10 nanometers (nm) or less; about 100 nanometers (nm) or less; about 200 nm or less; about 500 nm or less; about 1 micrometer (μm) or less; about 5 μm or less; about 10 μm or less; about 25 μm or less; about 50 μm or less; or about 100 μm or less. After patterning on, across, or about the upper surface 310 of the substrate 220 the second photodetector array 128 may have a thickness of: about 10 nanometers (nm) or less; about 100 nanometers (nm) or less; about 200 nm or less; about 500 nm or less; about 1 micrometer (μm) or less; about 5 μm or less; about 10 μm or less; about 25 μm or less; about 50 μm or less; or about 100 μm or less. The thickness of the individual elements forming the first photodetector array 126 and the individual elements forming the second photodetector array 128 may be the same or different.

Referring now to FIG. 3C, in embodiments, the first photodetector array 126 selectively generates photo-electrons 222A in response to at least some incident photons 202A in the first spectral band. The second photodetector array 128 selectively generates photo-electrons 222B in response to at least some incident photons 202B in a second spectral band. Photons 202A and 202B pass through the substrate 220 and fall incident on either the first photodetector array 126 or the second photodetector array 128. The photo-electrons 222A and 222B generated by the first optoelectronic material forming the first photodetector array 126 and the second optoelectronic material forming the second photodetector array 128, respectively, are emitted into the vacuum space 224 between the dual-spectrum photocathode 120 and the microchannel plate 130. In embodiments, the first spectral band may partially or completely overlap the second spectral band. In other embodiments, the second spectral band may partially or completely overlap the first spectral band. In embodiments, at least a portion of the second spectral band does not overlap the first spectral band. In embodiments, the first spectral band may include some or all of the visible portion of the electromagnetic spectrum (i.e., electromagnetic energy having wavelengths of from about 390 nanometers (nm) to about 700 nm). In embodiments, the second spectral band may include some or all of the invisible portion of the electromagnetic spectrum (i.e., electromagnetic energy having wavelengths in the SWIR spectrum of from about 900 nanometers (nm) to about 1700 nm).

Referring now to FIG. 3D, although the first photodetector array 126 and the second photodetector array 128 may have the same thickness 320 (e.g., as depicted in FIG. 3B), in some embodiments, the first photodetector array 126 and the second photodetector array 128 may have different thicknesses. For example, the elements forming the first photodetector array 126 have a first thickness 330 that is selected or determined based on a desired band gap or quantum efficiency for incident photons 202A in a first portion (e.g., a visible portion) of the electromagnetic spectrum. Similarly, the elements forming the second photodetector array 128 have a second thickness 340 that is selected or determined based on a desired band gap or quantum efficiency for incident photons 202B in a second portion (e.g., SWIR portion) of the electromagnetic spectrum.

Referring now to FIG. 3E, in embodiments, the elements forming the first photodetector array 126 and the elements forming the second photodetector array 128 may be patterned or otherwise disposed onto the substrate 202 such that gaps 350A-350*n* (collectively, "gaps 350") exist between neighboring elements. In embodiments, the gaps 350 may electrically isolate each of the elements forming the first photodetector array 126 and the second photodetector array 128 from some or all neighboring elements. In embodiments, the gaps 350 may be formed by patterning the first photodetector array 126 and the second photodetector array 128. In embodiments, the gaps 350 may be formed by removing a portion of the first photodetector array 126 and/or the second photodetector array 128 after deposition and/or patterning of the first photodetector array 126 and the second photodetector array 128 on the substrate 220. The gaps 350 may have uniform or differing widths 352A-352*n*. In embodiments, the gaps 350 may have widths 352 of: about 1 nanometer (nm) or less; about 10 nm or less; about 100 nm or less; about 500 nm or less; about 1 micrometer (μm) or less; about 3 μm or less; or about 5 μm or less.

Figure 3F:
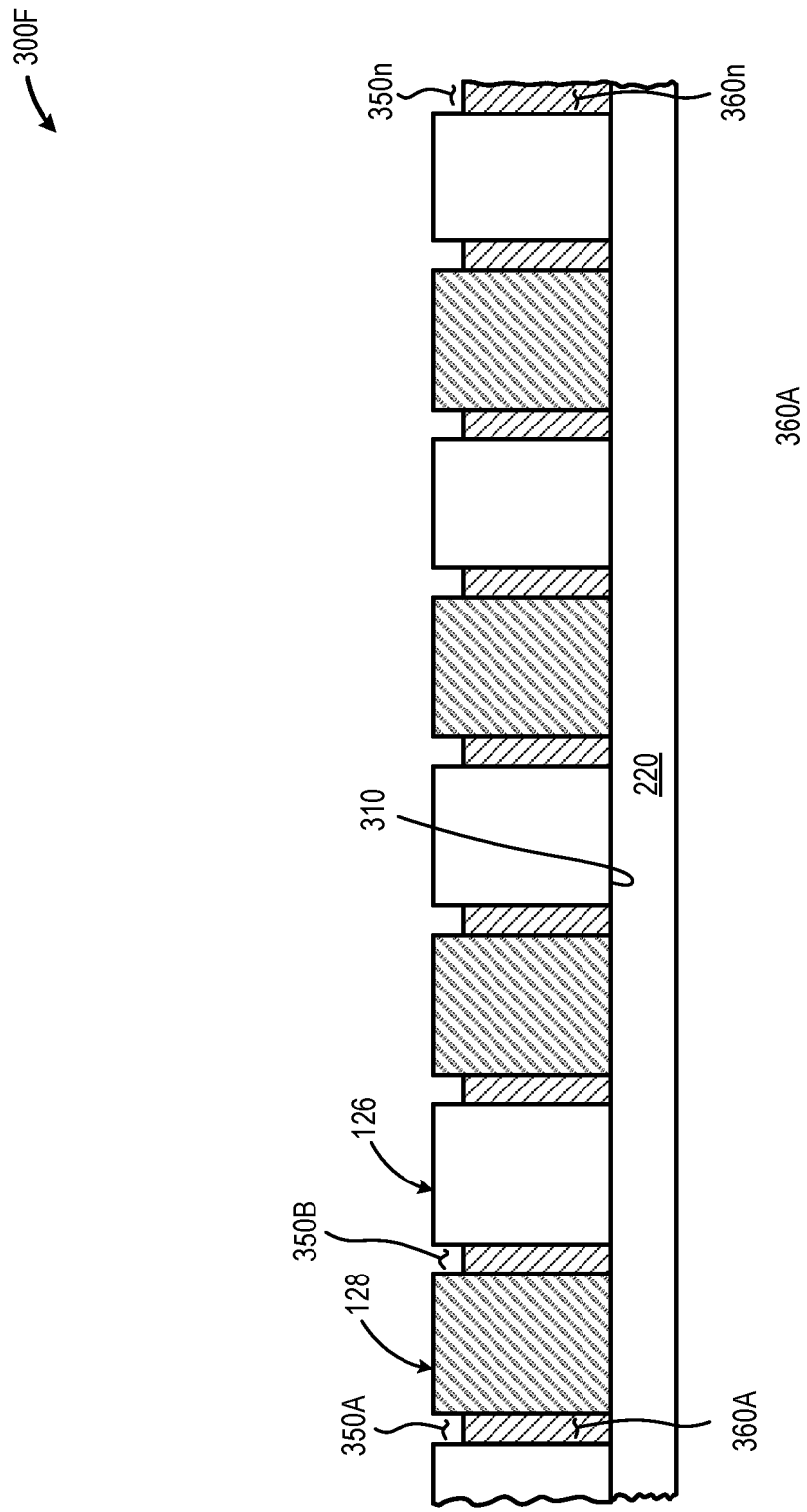
FIG. 3F is a partial cross-sectional elevation of the illustrative dual-spectrum photocathode depicted in FIGS. 3A and 3E in which a material is deposited in each of the gaps that separate the elements included in a first photodetector array from elements included in a second photodetector array, in accordance with at least one embodiment described herein.

Referring now to FIG. 3F, in embodiments, the elements forming the first photodetector array 126 and the elements forming the second photodetector array 128 may be patterned or otherwise disposed onto the substrate such that gaps 330 exist between neighboring elements, and at least some of the gaps 350 may be at least partially filled with one or more gap-filling materials 360A-360*n* (collectively "gap-filling materials 360"). In embodiments, the gap-filling materials 360 may be flush with the upper surface of either or both the first photodetector array 126 and/or the second photodetector array 128. In other embodiments, the gap-filling material 360 may be beneath the upper surface of either or both the first photodetector array 126 and/or the second photodetector array 128. In embodiments, the gap-filling material 360 may include one or more dielectric materials. In other embodiments, the gap-filling material 360 may include one or more electrically conductive materials.

Figure 4A:
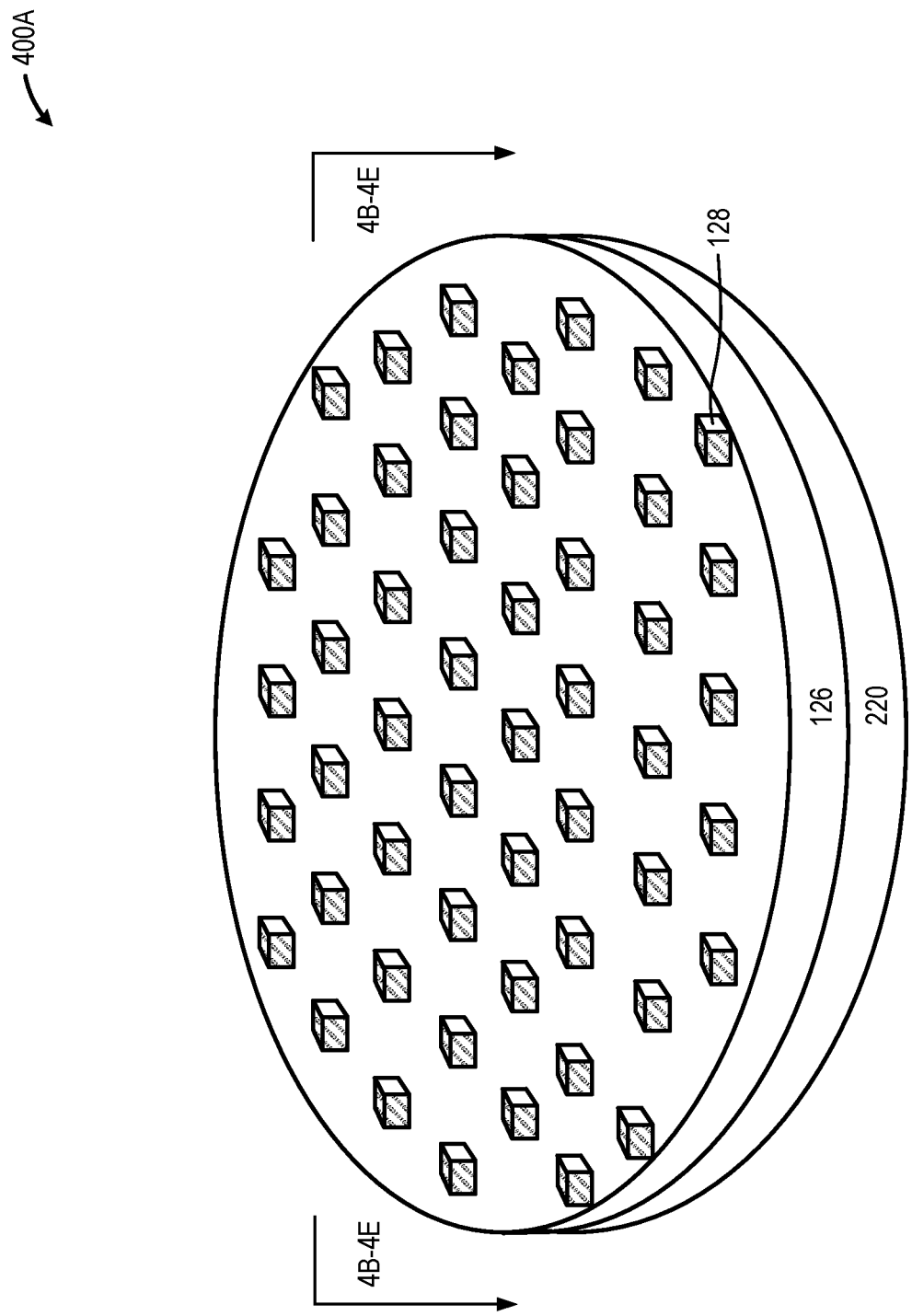
FIG. 4A is a perspective view of an illustrative dual-spectrum photocathode in which a second optoelectronic material forming a second photodetector array is patterned or otherwise deposited on, about, or across at least a portion of an upper surface of a first optoelectronic material forming a first photodetector array, in accordance with at least one embodiment described herein.
Figure 4B:
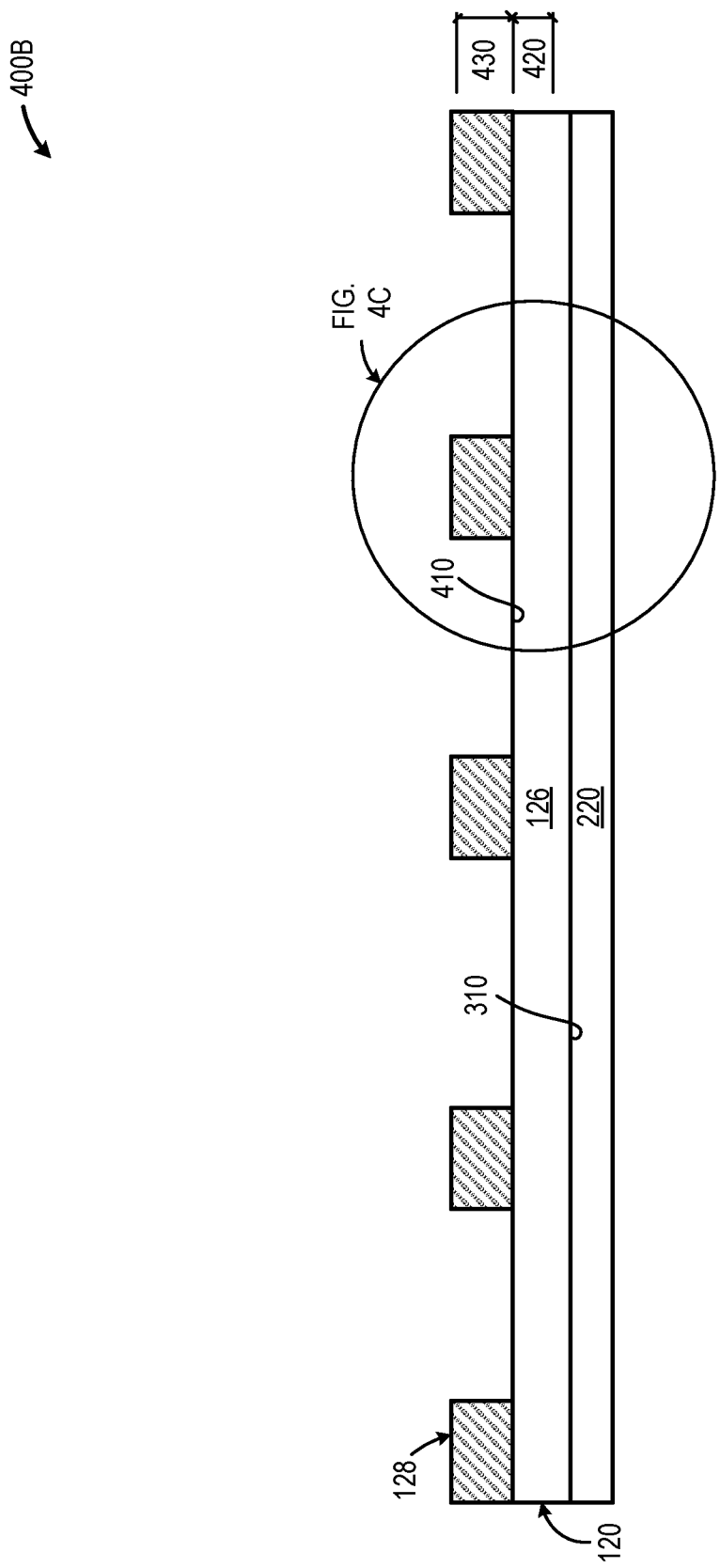
FIG. 4B is a partial cross-sectional elevation of the illustrative dual-spectrum photocathode depicted in FIG. 4A along sectional line 4B-4B, in accordance with at least one embodiment described herein.
Figure 4C:
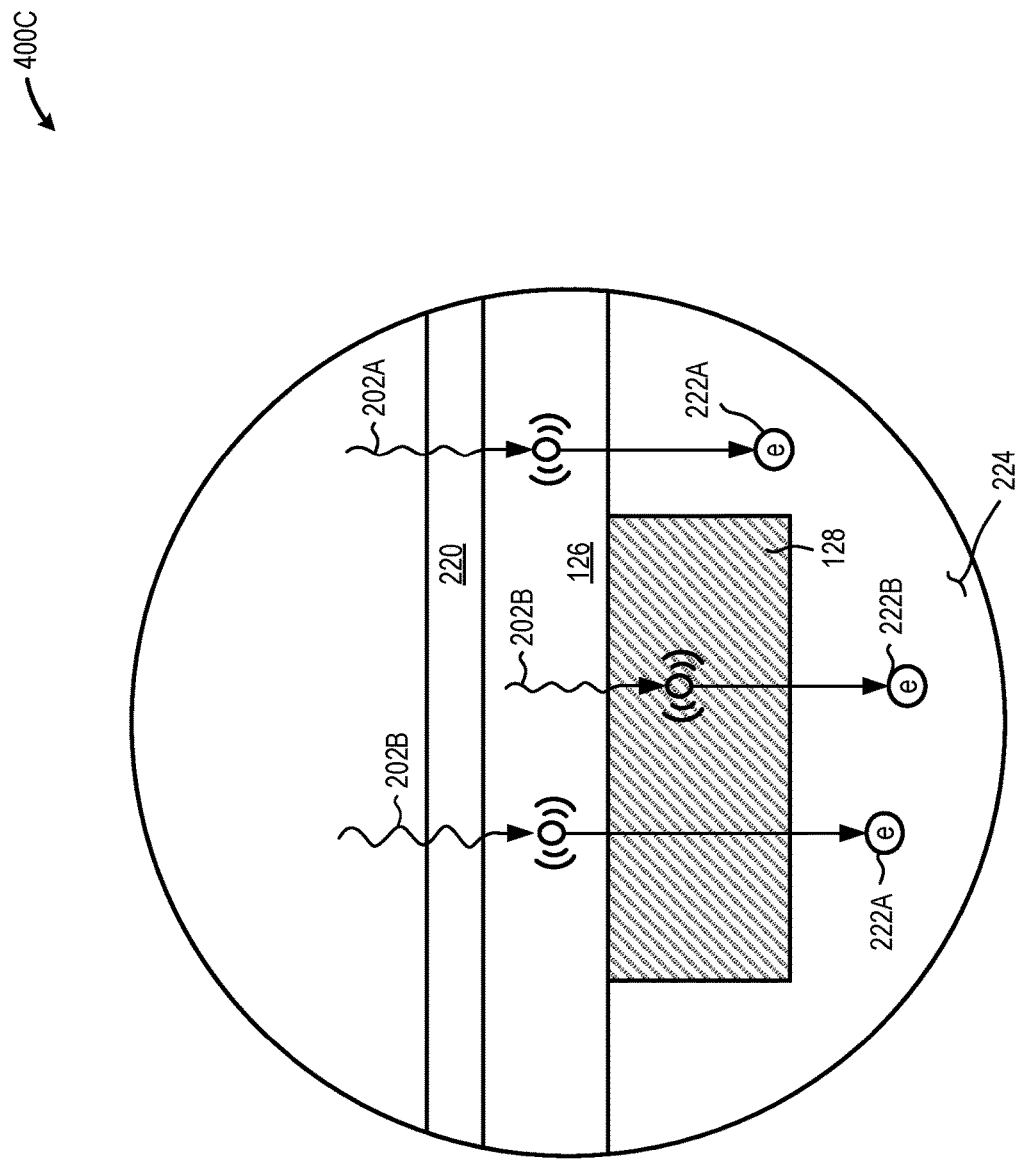
FIG. 4C is an expanded cross-sectional elevation of the illustrative dual-spectrum photocathode depicted in FIG. 4B that depicts the emission of one or more photo-electrons from the dual-spectrum photocathode 120, in accordance with at least one embodiment described herein.
Figure 4D:
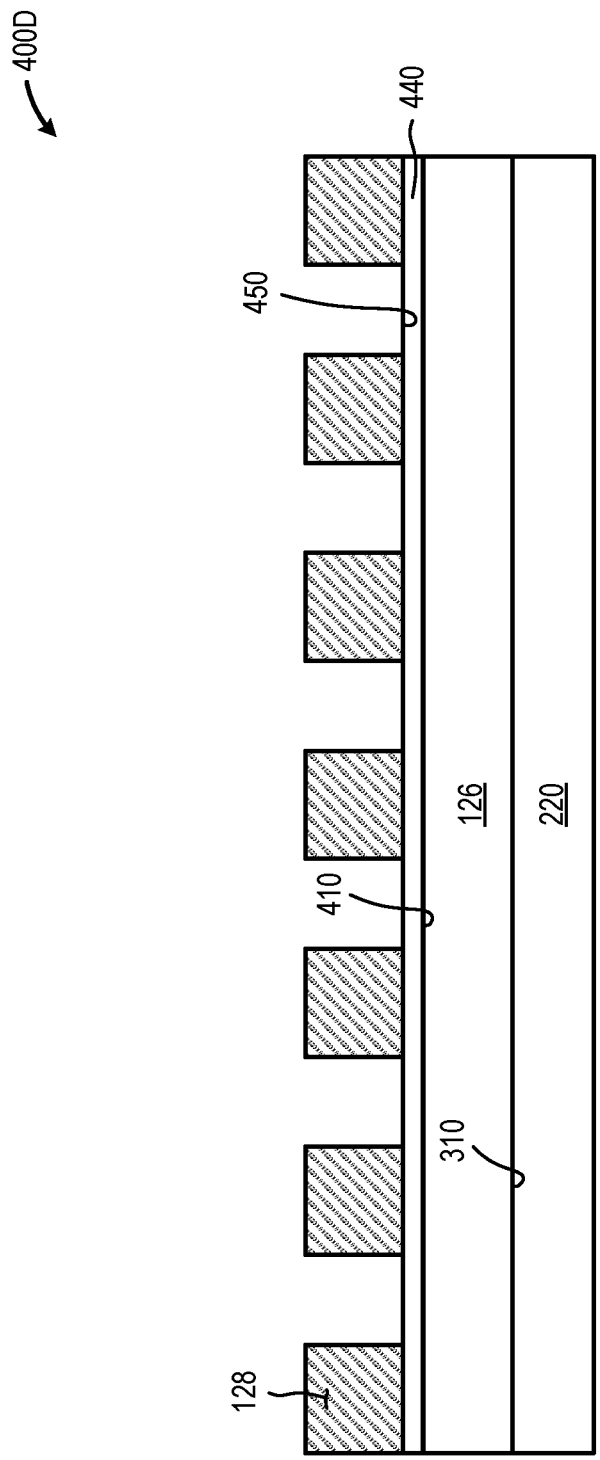
FIG. 4D is a cross-sectional elevation of the illustrative dual-spectrum photocathode depicted in FIG. 4A in which an interposer layer is deposited continuously across at least a portion of the upper surface of the first optoelectronic material layer forming the first photodetector array, such that the interposer layer is disposed between the upper surface of the first photodetector array and the second photodetector array, in accordance with at least one embodiment described herein.
Figure 4E:
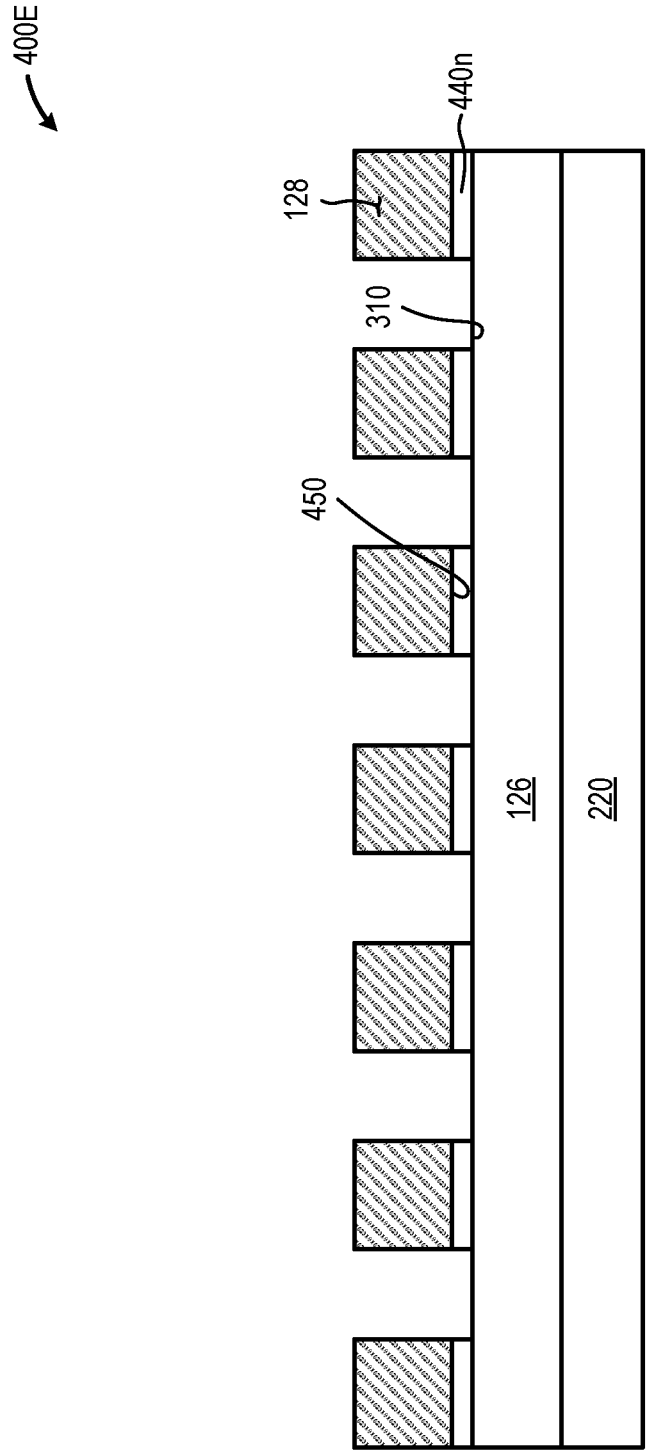
FIG. 4E is a cross-sectional elevation of the illustrative dual-spectrum photocathode depicted in FIG. 4A in which an interposer layer is deposited only between the second optoelectronic material elements forming the second photodetector array and the first optoelectronic material layer forming the first photodetector array, in accordance with at least one embodiment described herein.

FIG. 4A is a perspective view of an illustrative dual-spectrum photocathode 120 in which a second optoelectronic material forming a second photodetector array 128 is patterned or otherwise deposited on, about, or across at least a portion of an upper surface 410 of a first optoelectronic material forming a first photodetector array 126, in accordance with at least one embodiment described herein. FIG. 4B is a partial cross-sectional elevation of the illustrative dual-spectrum photocathode 120 depicted in FIG. 4A along sectional line 4B-4B, in accordance with at least one embodiment described herein. FIG. 4C is an expanded cross-sectional elevation of the illustrative dual-spectrum photocathode 120 depicted in FIG. 4B that depicts the emission of one or more photo-electrons 222A, 222B from the dual-spectrum photocathode 120, in accordance with at least one embodiment described herein. FIG. 4D is a cross-sectional elevation of the illustrative dual-spectrum photocathode 120 depicted in FIG. 4A in which an interposer layer 440 is deposited continuously across at least a portion of the upper surface 410 of the first optoelectronic material layer forming the first photodetector array 126, such that the interposer layer 440 is disposed between the upper surface 410 of the first photodetector array 126 and the second photodetector array 128, in accordance with at least one embodiment described herein. FIG. 4E is a cross-sectional elevation of the illustrative dual-spectrum photocathode 120 depicted in FIG. 4A in which an interposer layer 450 is deposited only between the second optoelectronic material elements forming the second photodetector array 128 and the first optoelectronic material layer forming the first photodetector array 126, in accordance with at least one embodiment described herein.

Referring first to FIG. 4A, in embodiments where the first optoelectronic material that forms the first photodetector array 126 is disposed on, about, or across the substrate 220, the first photodetector array 126 may be disposed as a layer across: about 20% or more; 30% or more; about 40% or more; about 50% or more; about 60% or more; about 70% or more; about 80% or more; about 85% or more; about 90%; about 95% or more; about 97% or more; or about 99% or more of the surface area of the substrate 220. In embodiments where the second photodetector array 128 is patterned or otherwise disposed in, across, or about the first photodetector array 126, such as depicted FIG. 4A, the second optoelectronic material 126 may be disposed across: about 5% or less; about 10% or less; about 15% or less; about 20% or less; about 25% or less; about 30% or less; about 35% or less; about 40% or less; or about 45% or less of the area of the upper surface 410 of the first optoelectronic material forming the first photodetector array 126.

In the embodiments depicted in FIGS. 4A-4E, photoelectrons 222B generated by the second photodetector array 128 must pass through the layer of first optoelectronic material forming the first photodetector array 126. In embodiments, one or more crystalline lattice parameters (lattice constant(s) such as principal axis lengths of the unit cell, edges of the unit cell, angles between the unit cells, lattice planes, etc.) of the first optoelectronic material may be matched to one or more crystalline lattice parameters of the second optoelectronic material to minimize lattice mismatch between the first photodetector array 126 and the second photodetector array 128. Minimizing the lattice mismatch between the first photodetector array 126 and the second photodetector array 128 beneficially improves the likelihood that a photo-electron 222B generated in the second photodetector array 128 can pass through the first photodetector array 126 and into the vacuum space 224 between the dual-spectrum photocathode 120 and the microchannel plate 130.

In addition, the thicknesses of either or both the first optoelectronic material and/or the second optoelectronic material may be adjusted to provide different incident photon 202A, 202B absorption characteristics, such as electron band gap, mean free path length, photo-electron generation, and/or quantum efficiency. After deposition on, across, or about the substrate 220, the first optoelectronic material forming the first photodetector array 126 may have a thickness of: about 10 nanometers (nm) or less; about 100 nm or less; about 200 nm or less; about 500 nm or less; about 1 micrometer (μm) or less; about 5 μm or less; about 10 μm or less; about 25 μm or less; about 50 μm or less; or about 100 μm or less. After depositing, forming, or otherwise patterning the second optoelectronic material forming the second photodetector array 128 on the first photodetector array 126, the second optoelectronic material forming the second photodetector array 128 may have a thickness of: about 10 nanometers (nm) or less; about 100 nm or less; about 200 nm or less; about 500 nm or less; about 1 micrometer (μm) or less; about 5 μm or less; about 10 μm or less; about 25 μm or less; about 50 μm or less; or about 100 μm or less.

Although the second photodetector array 128 is depicted in FIG. 4A as disposed in a regular pattern across the upper surface 410 of the first photodetector array 126, the individual elements forming the second photodetector array 128 may be disposed in any random or structured pattern (e.g., triangular pitch, circles, ellipses, spirals, or pseudo-random patterning). For example, in some embodiments, the individual elements forming the second photodetector array 128 may be concentrated in a limited portion of the upper surface 410 of the first photodetector array 126 to provide dual-spectrum enhanced vision capabilities in only a portion of the dual-spectrum photodetector 120. In another embodiment, the thicknesses of each of the individual elements forming the second photodetector array 128 may vary to provide differing levels of sensitivity to incoming photons 202B in the second spectral band. In yet another example, the second photodetector array 128 may include a single element disposed across a portion of the first optoelectronic material forming the first photodetector array 126.

Referring now to FIG. 4B, in embodiments where the individual elements forming the second photodetector array 128 are patterned, formed, or otherwise disposed on, about, or across the upper surface 410 of the first optoelectronic material layer forming the first photodetector array 126, the thickness 420 of the first optoelectronic material forming the first photodetector array 126 may be adjusted to provide different incident light absorption characteristics (e.g., band gap) with respect to incident photons 202A in a first spectral band. Similarly, the thickness 430 of the second optoelectronic material forming the second photodetector array 128 may be adjusted to provide different incident light absorption characteristics with respect to incident photons 202B in a second spectral band.

After patterning on, across, or about the upper surface 310 of the substrate 220, the first optoelectronic material layer forming the first photodetector array 126 may have a thickness 420 of: about 10 nanometers (nm) or less; about 100 nanometers (nm) or less; about 200 nm or less; about 500 nm or less; about 1 micrometer (μm) or less; about 5 μm or less; about 10 μm or less; about 25 μm or less; about 50 μm or less; or about 100 μm or less. After patterning on, across, or about the upper surface 410 of the first photodetector array 126, the second optoelectronic material forming the second photodetector array 128 may have a thickness of: about 10 nanometers (nm) or less; about 100 nanometers (nm) or less; about 200 nm or less; about 500 nm or less; about 1 micrometer (μm) or less; about 5 μm or less; about 10 μm or less; about 25 μm or less; about 50 μm or less; or about 100 μm or less. The thickness of the first optoelectronic material layer forming the first photodetector array 126 and the thickness of the second optoelectronic material forming the second photodetector array 128 may be the same or different.

Referring now to FIG. 4C, in embodiments, the first photodetector array 126 selectively generates photo-electrons 222A in response to at least some incident photons 202A in the first spectral band. The second photodetector array 128 selectively generates photo-electrons 222B in response to at least some incident photons 202B in a second spectral band. In embodiments, the first spectral band may partially or completely overlap the second spectral band. In other embodiments, the second spectral band may partially or completely overlap the first spectral band. In embodiments, at least a portion of the second spectral band does not overlap the first spectral band. In embodiments, the first spectral band may include some or all of the visible portion of the electromagnetic spectrum (i.e., electromagnetic energy having wavelengths of from about 390 nanometers (nm) to about 700 nm). In embodiments, the second spectral band may include some or all of the invisible portion of the electromagnetic spectrum (i.e., electromagnetic energy having wavelengths in the SWIR spectrum of from about 900 nanometers (nm) to about 1700 nm).

Referring now to FIG. 4D, in embodiments, an interposer layer 440 may be disposed on, about, or across all or a portion of the upper surface 410 of the first photodetector array 126 and the individual elements forming at least a portion of the second photodetector array 128 may be disposed on, about, or across at least a portion of an upper surface 450 of the interposer layer 440. Thus, the interposer layer 440 may be positioned between the first photodetector array 126 and the second photodetector array 128. In embodiments, the interposer layer 440 may include one or more materials that pass electromagnetic energy in all or a portion of the first spectral range. In embodiments, the interposer layer 440 may include one or more materials that pass electromagnetic energy in all or a portion of the second spectral range. The interposer layer 440 may be patterned, formed or otherwise deposited across at least a portion of the upper surface 410 of the first photodetector array 126 using any currently available or future developed material deposition techniques, methods, and/or processes. Example material deposition processes include, but are not limited to, electroplating, electroless plating, sputtering, chemical vapor deposition (CVD), physical vapor deposition, atomic layer deposition (ALD), spin coating, and/or similar thin film deposition processes or methods. The interposer layer 440 may have a uniform or non-uniform thickness. In embodiments, the interposer layer 440 may have a thickness of: about 10 nanometers (nm) or less; about 100 nanometers (nm) or less; about 200 nm or less; about 500 nm or less; about 1 micrometer (µm) or less; about 5 µm or less; about 10 µm or less; about 25 µm or less; about 50 µm or less; or about 100 µm or less.

In embodiments, the interposer layer 440 may include one or more dielectric materials. Example dielectric materials include, but are not limited to: carbides (e.g., silicon carbide); nitrides (e.g., silicon nitride); organic polymers; organic epoxies; and similar electrically insulative materials. In other embodiments, the interposer layer 440 may include one or more electrically conductive materials. Example electrically conductive materials include, but are not limited to: copper, copper containing alloys, aluminum, aluminum containing alloys; conductive polymers (e.g., indium-tin oxide); polymers that include an electrically conductive material (e.g., a polymer matrix containing conductive nanostructures or nanowires, such as silver nanowires); and similar electrically conductive materials.

Referring now to FIG. 4E, in embodiments, an interposer layer 440 may be selectively disposed on the upper surface 410 of the first photodetector array 126 between the individual elements forming at least a portion of the second photodetector array 128 and the first photodetector array 126. Thus, the interposer layer 440 may be selectively positioned between the first photodetector array 126 and each of the individual elements forming the second photodetector array 128. In embodiments, the interposer layer 440 may include one or more materials that pass electromagnetic energy in all or a portion of the first spectral range. In embodiments, the interposer layer 440 may include one or more materials that pass electromagnetic energy in all or a portion of the second spectral range.

The interposer layer 440 may be patterned, formed or otherwise deposited across at least a portion of the upper surface 410 of the first photodetector array 126 using any currently available or future developed material deposition techniques, methods, and/or processes. Example material deposition processes include, but are not limited to, electroplating, electroless plating, sputtering, chemical vapor deposition (CVD), physical vapor deposition, atomic layer deposition (ALD), spin coating, and/or similar thin film deposition processes or methods. The interposer layer 440 may have a uniform or non-uniform thickness. In embodiments, the interposer layer 440 may have a thickness of: about 10 nanometers (nm) or less; about 100 nanometers (nm) or less; about 200 nm or less; about 500 nm or less; about 1 micrometer (µm) or less; about 5 µm or less; about 10 µm or less; about 25 µm or less; about 50 µm or less; or about 100 µm or less.

In embodiments, the interposer layer 440 may include one or more dielectric materials. Example dielectric materials include, but are not limited to: carbides (e.g., silicon carbide); nitrides (e.g., silicon nitride); organic polymers; organic epoxies; and similar electrically insulative materials. In other embodiments, the interposer layer 440 may include one or more electrically conductive materials. Example electrically conductive materials include, but are not limited to: copper, copper containing alloys, aluminum, aluminum containing alloys; conductive polymers (e.g., indium-tin oxide); polymers that include an electrically conductive material (e.g., a polymer matrix containing conductive nanostructures or nanowires, such as silver nanowires); and similar electrically conductive materials.

Figure 5A:
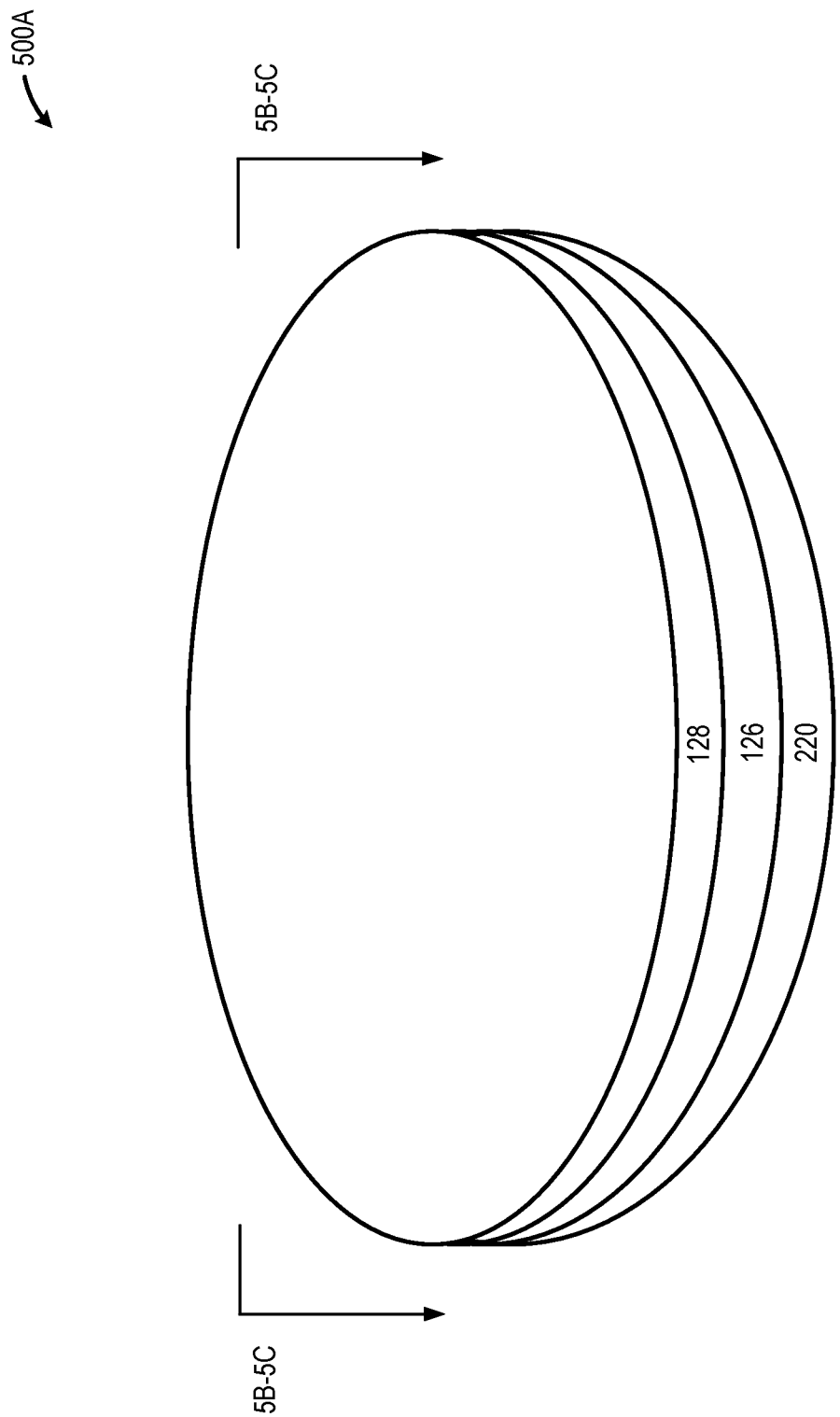
FIG. 5A is a perspective view of an illustrative dual-spectrum photocathode in which a second optoelectronic material that forms a second photodetector array is deposited on, across or about at least a portion of an underlying first optoelectronic material that forms a first photodetector array, in accordance with at least one embodiment described herein.

FIG. 5A is a perspective view of an illustrative dual-spectrum photocathode 500A in which a second optoelectronic material that forms a second photodetector array 128 is deposited on, across or about at least a portion of an underlying first optoelectronic material that forms a first photodetector array 126, in accordance with at least one embodiment described herein. FIG. 5B is a partial cross-sectional elevation of the illustrative dual-spectrum photocathode 120 depicted in FIG. 5A along sectional line 5B-5B, in accordance with at least one embodiment described herein. FIG. 5C is an expanded cross-sectional elevation of the illustrative dual-spectrum photocathode 120 depicted in FIG. 5A along sectional line 5C-5C in which an interposer layer 440 is deposited continuously across at least a portion of the upper surface 410 of the first optoelectronic material layer forming the first photodetector array 126, such that the interposer layer 440 is disposed between the upper surface 410 of the first photodetector array 126 and the second photodetector array 128, in accordance with at least one embodiment described herein.

Turning first to FIG. 5A, in embodiments where the first optoelectronic material that forms the first photodetector array 126 is disposed on, about, or across the substrate 220, the first photodetector array 126 may be disposed as a layer across: about 20% or more; 30% or more; about 40% or more; about 50% or more; about 60% or more; about 70% or more; about 80% or more; about 85% or more; about 90%; about 95% or more; about 97% or more; or about 99% or more of the surface area of the substrate 220. In embodiments where the second photodetector array 128 is deposited as a layer on, across, or about the first photodetector array 126, such as depicted FIG. 5A, the second optoelectronic material 126 may be disposed across: about 50% or more; about 50% or more; about 60% or more; about 70% or more; about 80% or more; about 90% or more; about 95% or more; about 99% or more of the area of the upper surface 410 of the first optoelectronic material forming the first photodetector array 126.

In the embodiments depicted in FIGS. 5A-5C, photoelectrons 222B generated by the second photodetector array 128 must pass through the layer of first optoelectronic material forming the first photodetector array 126. In embodiments, one or more crystalline lattice parameters (lattice constant(s) such as principal axis lengths of the unit cell, edges of the unit cell, angles between the unit cells, lattice planes, etc.) of the first optoelectronic material may be matched to one or more crystalline lattice parameters of the second optoelectronic material to minimize lattice mismatch between the first photodetector array 126 and the second photodetector array 128. Minimizing the lattice mismatch between the first photodetector array 126 and the second photodetector array 128 improves the likelihood that a photo-electron 222B generated in the second photodetector array 128 can pass through the first photodetector array 126 and into the vacuum space 224 between the dual-spectrum photocathode 120 and the microchannel plate 130.

In addition, the thicknesses of either or both the first optoelectronic material and/or the second optoelectronic material may be adjusted to provide different incident photon 202A, 202B absorption characteristics, such as electron band gap, mean free path length, photo-electron generation, and/or quantum efficiency. After deposition on, across, or about the substrate 220, the first optoelectronic material layer forming the first photodetector array 126 may have a thickness of: about 10 nanometers (nm) or less; about 100 nm or less; about 200 nm or less; about 500 nm or less; about 1 micrometer (μm) or less; about 5 μm or less; about 10 μm or less; about 25 μm or less; about 50 μm or less; or about 100 μm or less. After depositing, forming, or otherwise patterning the second optoelectronic material forming the second photodetector array 128 on the first photodetector array 126, the second optoelectronic material layer forming the second photodetector array 128 may have a thickness of: about 10 nanometers (nm) or less; about 100 nm or less; about 200 nm or less; about 500 nm or less; about 1 micrometer (μm) or less; about 5 μm or less; about 10 μm or less; about 25 μm or less; about 50 μm or less; or about 100 μm or less.

Referring now to FIG. 5C, in embodiments, an interposer layer 440 may be disposed on, about, or across all or a portion of the upper surface 410 of the first photodetector array 126 and the second optoelectronic material layer forming at least a portion of the second photodetector array 128 may be disposed on, about, or across at least a portion of an upper surface 450 of the interposer layer 440. Thus, the interposer layer 440 may be positioned between the first photodetector array 126 and the second photodetector array 128. In embodiments, the interposer layer 440 may include one or more materials that pass electromagnetic energy in all or a portion of the first spectral range. In embodiments, the interposer layer 440 may include one or more materials that pass electromagnetic energy in all or a portion of the second spectral range.

The interposer layer 440 may be patterned, formed or otherwise deposited across at least a portion of the upper surface 410 of the first photodetector array 126 using any currently available or future developed material deposition techniques, methods, and/or processes. Example material deposition processes include, but are not limited to, electroplating, electroless plating, sputtering, chemical vapor deposition (CVD), physical vapor deposition, atomic layer deposition (ALD), spin coating, and/or similar thin film deposition processes or methods. The interposer layer 440 may have a uniform or non-uniform thickness. In embodiments, the interposer layer 440 may have a thickness of: about 10 nanometers (nm) or less; about 100 nanometers (nm) or less; about 200 nm or less; about 500 nm or less; about 1 micrometer (μm) or less; about 5 μm or less; about 10 μm or less; about 25 μm or less; about 50 μm or less; or about 100 μm or less.

In embodiments, the interposer layer 440 may include one or more dielectric materials. Example dielectric materials include, but are not limited to: carbides (e.g., silicon carbide); nitrides (e.g., silicon nitride); organic polymers; organic epoxies; and similar electrically insulative materials. In other embodiments, the interposer layer 440 may include one or more electrically conductive materials. Example electrically conductive materials include, but are not limited to: copper, copper containing alloys, aluminum, aluminum containing alloys; conductive polymers (e.g., indium-tin oxide); polymers that include an electrically conductive material (e.g., a polymer matrix containing conductive nanostructures or nanowires, such as silver nanowires); and similar electrically conductive materials.

Figure 6:
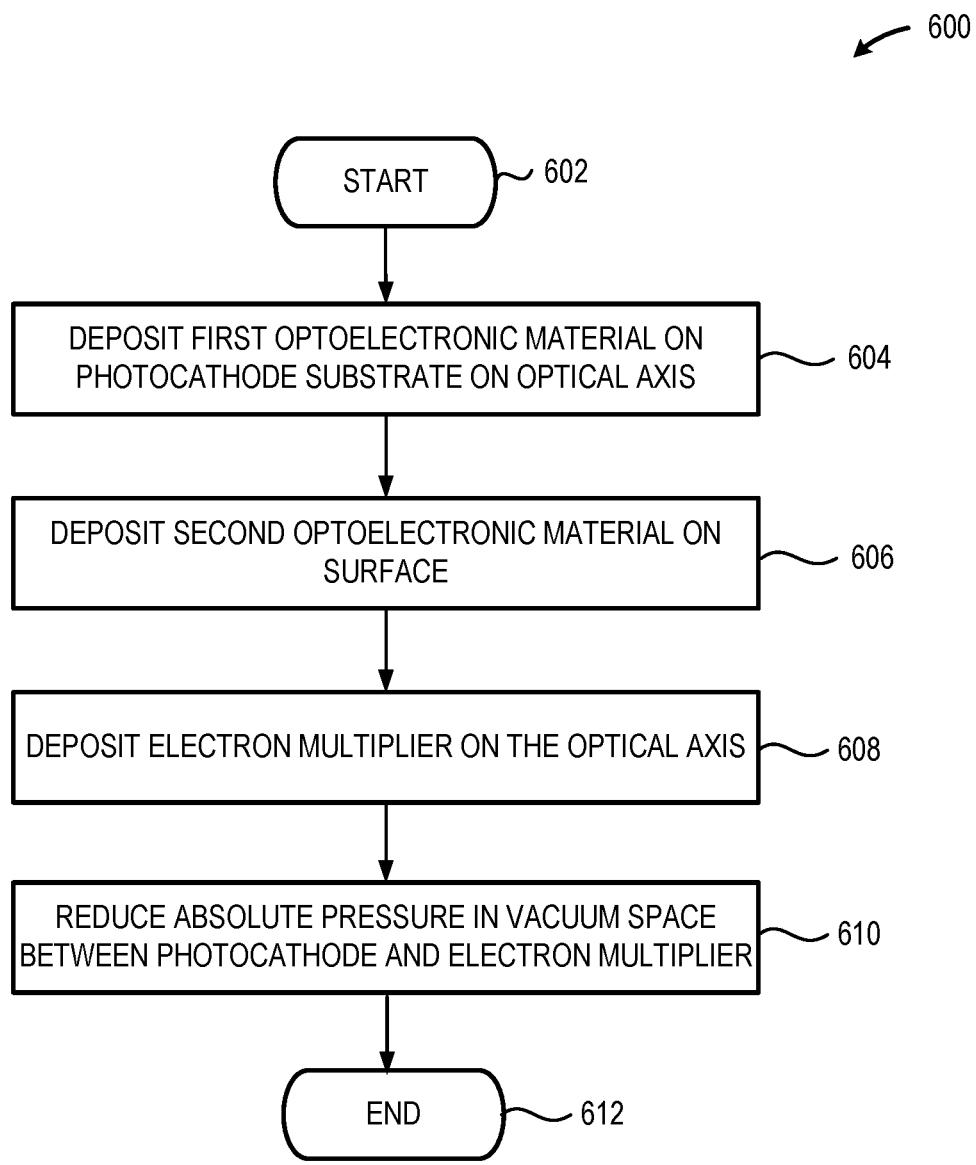
FIG. 6 is a high-level flow diagram of an illustrative method of manufacturing a dual-spectrum photodetector useful for contemporaneously intensifying images acquired in a first spectral band (e.g., the visible electromagnetic spectrum between 390 nm and 700 nm) and in a second spectral band (e.g., the SWIR electromagnetic spectrum above 900 nm), in accordance with at least one embodiment described herein.

FIG. 6 is a high-level flow diagram of an illustrative method 600 of manufacturing a dual-spectrum photodetector 120 useful for contemporaneously intensifying images acquired in a first spectral band (e.g., the visible electromagnetic spectrum between 390 nm and 700 nm) and in a second spectral band (e.g., the SWIR electromagnetic spectrum above 900 nm), in accordance with at least one embodiment described herein. The dual-spectrum photocathode 120 described herein beneficially and advantageously amplifies incident photons in a first spectral band and incident photons in a second spectral band that would otherwise be invisible in the enhanced image produced by the enhanced vision system 100. Such an arrangement beneficially and advantageously permits the use of pointers and/or designators equipped with an emitter 150 capable of generating an output in the second spectral band. The method 600 commences at 602.

At 604, a first optoelectronic material that forms a first photodetector array 126 is deposited, patterned, formed, or otherwise disposed on, across, or about at least a portion of a substrate 220. In some implementations, the substrate 220 may include an entrance window to an image intensifier 102. In embodiments, the first photodetector array 126 may include optoelectronic materials sensitive to electromagnetic energy in at least a portion of the visible electromagnetic spectrum. The first optoelectronic material may be deposited, patterned, formed, or otherwise disposed on, across, or about at least a portion of a substrate 220 using any number and/or combination of any currently available or future developed material deposition methods or processes. Example material deposition processes include, but are not limited to, chemical vapor deposition, physical vapor deposition, thin film deposition, atomic layer deposition, photolithographic deposition, printing, electroplating, electroless plating, and similar. The first optoelectronic material may include any number and/or combination of ternary and/or quaternary compounds having a thickness of from about 10 nanometers (nm) to about 100 micrometers (μm).

At 606, a second optoelectronic material that forms the second photodetector array 128 is disposed proximate a surface in the dual-spectrum photodetector 120. In embodiments, the second optoelectronic material may be disposed proximate a second portion of the substrate 220. In other embodiments, the second optoelectronic material may be disposed on, about, or proximate the first optoelectronic material forming the first photodetector array 126. In embodiments, the second optoelectronic material may include one or more materials sensitive to electromagnetic energy in at least a portion of the non-visible, SWIR, electromagnetic spectrum. The second optoelectronic material may be deposited, patterned, formed, or otherwise disposed on, across, or about at least a portion of a substrate 220 and/or the first optoelectronic material using any number and/or combination of any currently available or future developed material deposition methods or processes. Example material deposition processes include, but are not limited to, chemical vapor deposition, physical vapor deposition, thin film deposition, atomic layer deposition, photolithographic deposition, printing, electroplating, electroless plating, and similar. The second optoelectronic material may include any number and/or combination of ternary and/or quaternary compounds having a thickness of from about 10 nanometers (nm) to about 100 micrometers (μm).

At 608, an electron multiplier, such as a microchannel plate 130, is disposed on the same optical axis as the photocathode 120. In embodiments, the photocathode 120 and the microchannel plate 130 may be spaced apart.

At 610, the absolute pressure in the space between the photocathode 120 and the microchannel plate 130 may be reduced to a level below atmospheric pressure. In some embodiments, a near-vacuum may be formed in the space between the photocathode 120 and the microchannel plate 130, thereby forming the vacuum space 224. In operation, the photo-electrons 222A and 222B generated by the photocathode 120 are ejected from the surface of the photocathode 120 into the vacuum space 224. The method 600 concludes at 612.

Figure 7:
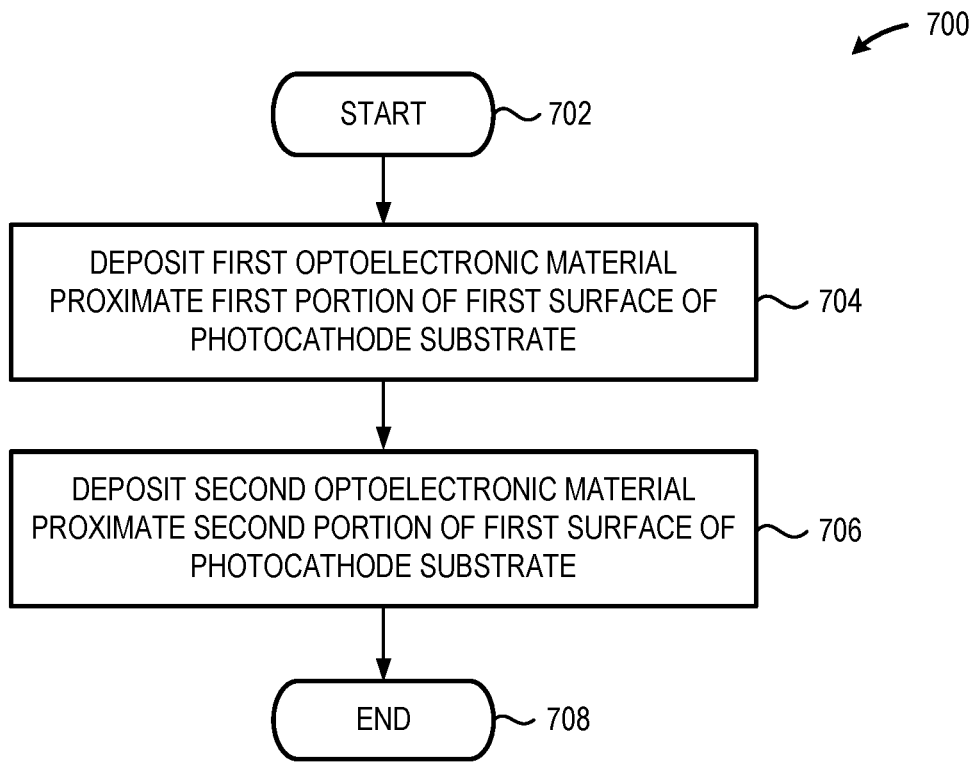
FIG. 7 is a high-level logic flow diagram of an illustrative method in which the first optoelectronic material forming the first photodetector array is deposited on a first portion of the photocathode substrate and the second optoelectronic material forming the second photodetector array is deposited on a second portion of the photocathode substrate, in accordance with at least one embodiment described herein.

FIG. 7 is a high-level logic flow diagram of an illustrative method 700 in which the first optoelectronic material forming the first photodetector array 126 is deposited on a first portion of the photocathode substrate 220 and the second optoelectronic material forming the second photodetector array 128 is deposited on a second portion of the photocathode substrate 220, in accordance with at least one embodiment described herein. The method 700 may be used in conjunction with the method 600 described in FIG. 6. The method 700 commences at 702.

At 704, the first optoelectronic material forming the first photodetector array 126 is deposited, patterned, or otherwise formed on a first portion of a first surface of the photocathode substrate 220. In embodiments, the first optoelectronic material may be disposed on the first portion of the substrate 220 as a layer having apertures to receive the second optoelectronic material. In other embodiments, the first optoelectronic material may be disposed as a plurality of elements that form the first photodetector array 126. In other embodiments, the first optoelectronic material may be disposed as a continuous layer on the first portion of the substrate 220.

At 706, the second optoelectronic material forming the second photodetector array 128 is deposited, patterned, or otherwise formed on a second portion of the first surface of the photocathode substrate 220. In embodiments, the second optoelectronic material may be disposed on the second portion of the substrate 220 as a plurality of elements that form the second photodetector array 126. In other embodiments, the second optoelectronic material may be disposed as a continuous layer on the second portion of the substrate 220. In some embodiments, the second optoelectronic material may be disposed proximate the first optoelectronic material such that the second optoelectronic material and the first optoelectronic material are in physical contact. In some embodiments, the second optoelectronic material and the first optoelectronic material may be spaced apart such that a gap or void exists between the second photodetector array 128 and the first photodetector array 126. In some embodiments, the second optoelectronic material and the first optoelectronic material may be spaced apart such that gaps or voids exists between the second photodetector array 128 and the first photodetector array 126 and a gap-filling material may be disposed in at least some of the gaps or voids between the first photodetector array 126 and the second photodetector array 128. The method 700 concludes at 708.

Figure 8:
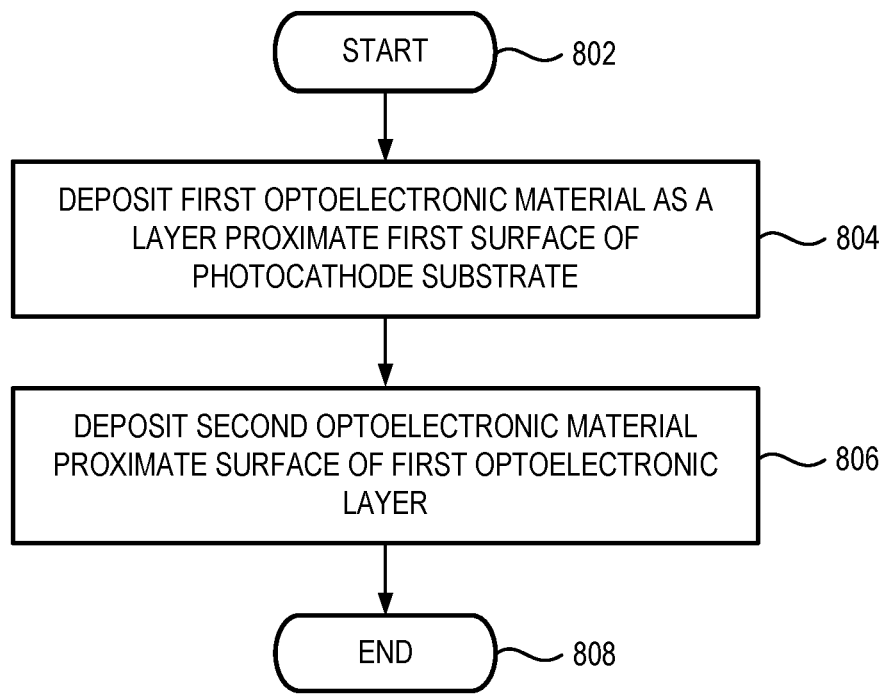
FIG. 8 is a high-level logic flow diagram of an illustrative method in which the first optoelectronic material forming the first photodetector array is deposited as a layer across the photocathode substrate and the second optoelectronic material forming the second photodetector array is deposited as a layer across the surface of the first photodetector array, in accordance with at least one embodiment described herein.

FIG. 8 is a high-level logic flow diagram of an illustrative method 800 in which the first optoelectronic material forming the first photodetector array 126 is deposited as a layer across the photocathode substrate 220 and the second optoelectronic material forming the second photodetector array 128 is deposited as a layer across the surface of the first photodetector array 126, in accordance with at least one embodiment described herein. The method 800 may be used in conjunction with the method 600 described in FIG. 6. The method 800 commences at 802.

At 804, the first optoelectronic material forming the first photodetector array 126 is deposited, patterned, formed, or otherwise disposed as a layer on a first surface of the photocathode substrate 220.

At 806, the second optoelectronic material forming the second photodetector array 128 is deposited, patterned, or otherwise formed on at least a portion of the surface of the first photodetector array 126. In embodiments, the second optoelectronic material may be disposed on the first photodetector array 126 as a plurality of elements that form the second photodetector array 126. In other embodiments, the second optoelectronic material may be disposed as a continuous layer across all or a portion of the first photodetector array 126. In some embodiments, an interposer layer 440 may be disposed between the first photodetector array 126 and the second photodetector array 128. The method 800 concludes at 808.

Figure 9:
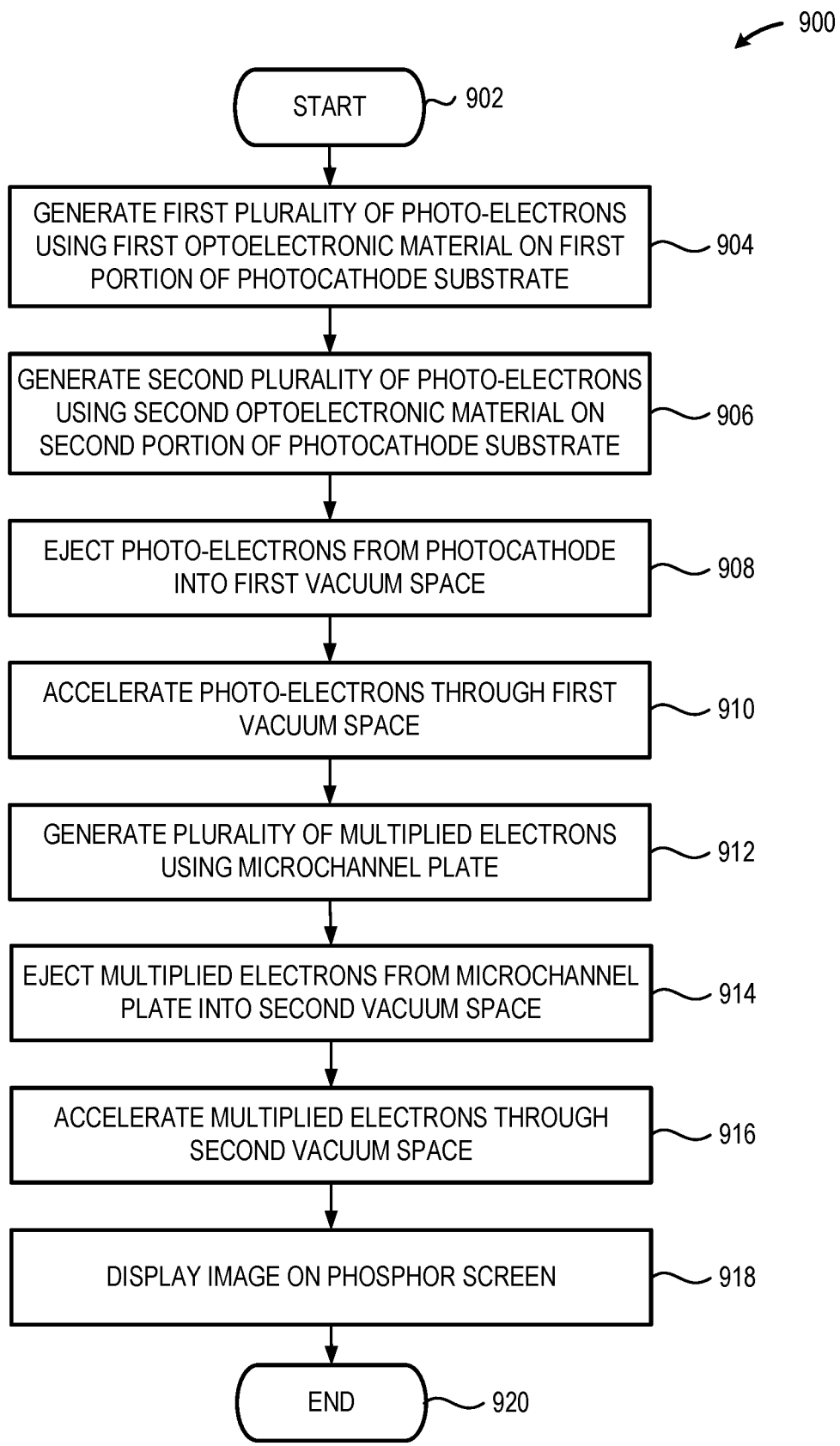
FIG. 9 is a high-level logic flow diagram of an illustrative enhanced vision method using an image intensifier that includes a dual-spectrum photocathode such as described in detail in FIGS. 1 through 5, in accordance with at least one embodiment described herein.

FIG. 9 is a high-level logic flow diagram of an illustrative enhanced vision method 900 using an image intensifier 102 that includes a dual-spectrum photocathode 120 such as described in detail in FIGS. 1 through 5, in accordance with at least one embodiment described herein. The dual-spectrum photocathode 120 includes a first photodetector array 126 that generates photo-electrons 222A responsive to incident photons in a first spectral band and a second photodetector array 128 that generates photo-electrons 222B responsive to incident photons in a second spectral band. For example, the first spectral band may include some or all of the visible electronic spectrum and the second spectral band may include at least a portion of the electromagnetic spectrum that is normally invisible to the human eye, such as short wave infrared (SWIR) portion of the electromagnetic spectrum. Such enhanced vision systems may beneficially and advantageously provide additional image detail and/or information that would be difficult or impossible to see in enhanced vision systems using a single spectrum photocathode. For example, at night photons in the visible portion of the electromagnetic spectrum are limited to light sources such as the moon, stars, and manmade light sources. However, additional photons in the short-wave infrared electromagnetic spectrum are also present. The systems and methods described herein beneficially and advantageously use both the photons visible to the human eye and the photons invisible to the human eye to generate an enhanced image quality in low light situations. The method 900 commences at 902.

At 904, photons 202A in a first spectral band impinge or otherwise fall incident upon a dual-spectrum photocathode 120 causing a first optoelectronic material that forms a first photodetector array 126 to emit photo-electrons 222A. In embodiments, the first optoelectronic material may be patterned, formed, deposited or otherwise disposed across at least a portion of the photocathode substrate 220.

At 906, photons 202B in a second spectral band impinge or otherwise fall incident upon a dual-spectrum photocathode 120 causing a second optoelectronic material that forms a second photodetector array 128 to emit photo-electrons 222B. In some embodiments, the second optoelectronic material may be patterned, formed, deposited or otherwise disposed across at least a portion of the photocathode substrate 220. In other embodiments, the second optoelectronic material may be patterned, formed, deposited or otherwise disposed on, across, or about at least a portion of the surface of the first optoelectronic material.

At 908, the photo-electrons 222A and 222B generated by the first optoelectronic material and the second optoelectronic material are ejected from the surface of the dual-spectrum photocathode 120 into a first vacuum space 224. In embodiments, the first vacuum space 224 may be maintained at an absolute pressure that is less than atmospheric pressure. In some embodiments, one or more materials that facilitate the departure of photo-electrons 222A and 222B from the surface of the dual-spectrum photocathode 120 may be deposited on, about, or across at least a portion of the surface of the dual-spectrum photocathode 120 exposed to the first vacuum space 224. In some embodiments, an electrical potential may be applied across all or a portion of the surface of the dual-spectrum photocathode 120 exposed to the first vacuum space 224.

At 910, the photo-electrons 222A and 222B in the first vacuum space 224 are accelerated through an electrical field generated a first voltage 230 applied across the first vacuum space 224 (i.e., an applied potential difference). In embodiments, the first voltage 230 may include voltages between +100V and −300V applied across the first vacuum space 224. The accelerated photo-electrons 222A and 222B travel across the first vacuum space 224 and impact the microchannel plate 130.

At 912, the accelerated photo-electrons 222A and 222B impact the microchannel plate 130, forming additional electrons (i.e., the "secondary electrons 252"). In embodiments, a second voltage 248 may be applied across the microchannel plate 130. In embodiments, the second voltage 248 may include voltages between +800V and +1200V applied across the microchannel plate 130.

At 914, the secondary electrons 252 are ejected from the surface of the microchannel plate 130 into a second vacuum space 254. In embodiments, the second vacuum space 254 may be maintained at an absolute pressure that is less than atmospheric pressure.

At 916, the secondary electrons 252 in the second vacuum space 254 are accelerated through an electrical field generated by a third voltage 250 applied across the second vacuum space 254 (i.e., an applied potential difference). In embodiments, the third voltage 230 may include voltages between +2500V and +6000V applied across the second vacuum space 254. The accelerated photo-electrons 222A and 222B travel across the second vacuum space 254 and impact the phosphor screen 140.

At 918, the accelerated, secondary electrons 252 strike the phosphor screen 140 where the electrons are reconverted to photons in the visible electromagnetic spectrum. The photons form an enhanced image of the scene captured by the photons 202A and 202B incident upon the dual-spectrum photocathode 120. The method 900 concludes at 920.

While FIGS. 6 through 9 are included to illustrate operations according to different embodiments, it is to be understood that not all of the operations depicted in FIGS. 6 through 9 are necessary for other embodiments. Indeed, it is fully contemplated herein that in other embodiments of the present disclosure, the operations depicted in FIGS. 6 through 9, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C.

As used in this application and in the claims, a list of items joined by the term "at least one of" can mean any combination of the listed terms. For example, the phrases "at least one of A, B or C" can mean A; B; C; A and B; A and C; B and C; or A, B and C.

Additionally, operations for the embodiments have been further described with reference to the above figures and accompanying examples. Some of the figures may include a logic flow. Although such figures presented herein may include a particular logic flow, it can be appreciated that the logic flow merely provides an example of how the general functionality described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited to this context.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. Thus, the breadth and scope of the present invention should not be limited by any of the above-described exemplary embodiments, but should be defined only in accordance with the following claims and their equivalents.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

What is claimed is:

1. A dual-spectrum image intensifier comprising:
   a photocathode that includes:
      a first photodetector array that includes a plurality of first photodetector array elements, each of the plurality of first photodetector array elements including a first optoelectronic material having a first thickness, the first optoelectronic material to generate photo-electrons in response to incident photons in a first spectral band, the first photodetector array disposed proximate a first portion of a first surface of a substrate; and a second photodetector array that includes a plurality of second photodetector array elements, each of the plurality of second photodetector array elements including a second optoelectronic material having a second thickness that is different from the first thickness and including at least one of: a silver oxide metal film, a gold oxide metal film, a platinum oxide metal film, a cobalt oxide metal film, or a cuprous oxide metal film, the second photodetector array to generate photo-electrons in response to incident photons in a second spectral band, the second spectral band including a portion of the electromagnetic spectrum different, at least in part, from the first spectral band, the second photodetector array disposed proximate a second portion of the first surface of the substrate;

wherein the photo-electrons generated by both the first photodetector array and the second photodetector array are emitted into a first vacuum space adjacent to at least a portion of at least the second photodetector array; and an electron multiplier separated from the photocathode by the first vacuum space.

2. The dual-spectrum image intensifier of claim 1 wherein the substrate comprises an entrance window to the dual-spectrum image intensifier.

3. The dual-spectrum image intensifier of claim 2 wherein the image intensifier entrance window includes at least one of: sapphire glass ($Al_2O_3$), quartz ($SiO_2$), magnesium fluoride ($MgF_2$), or calcium fluoride ($CaF_2$).

4. The dual-spectrum image intensifier of claim 1:
wherein the first spectral band comprises includes at least a portion of the visible electromagnetic spectrum that includes wavelengths from 390 nanometers (nm) to 700 nm; and
wherein the second spectral band comprises at least a portion of the short-wave infrared (SWIR) electromagnetic spectrum that includes wavelengths above 900 nanometers (nm).

5. The dual-spectrum image intensifier of claim 1 wherein the first optoelectronic material comprises a material having a first thickness of greater than 10 nanometers (nm).

6. The dual-spectrum image intensifier of claim 5 wherein the second optoelectronic material comprises a material having a thickness of less than 10 nanometers (nm).

7. The dual-spectrum image intensifier of claim 1:
wherein each of at least a portion of the plurality of first photodetector array elements at least partially surrounds each of at least a portion of the plurality of second photodetector array elements.

8. The dual-spectrum image intensifier of claim 7:
wherein the plurality of second photodetector array elements comprise a plurality of second photodetector array elements disposed proximate at least a portion of the first surface of the substrate in at least one of: a patterned distribution; a random distribution; or a biased distribution.

9. The dual-spectrum image intensifier of claim 1:
wherein a gap separates each of the plurality of first photodetector array elements from the plurality of second photodetector array elements.

10. The dual-spectrum image intensifier of claim 9, further comprising an interposer layer at least partially filling the gap separating each of the plurality of first photodetector array elements from the plurality of second photodetector array elements.

11. The dual-spectrum image intensifier of claim 10:
wherein the interposer layer comprises one of: a dielectric interposer layer.

12. The dual-spectrum image intensifier of claim 10:
wherein the interposer layer comprises an electrically conductive interposer layer.

13. A dual-spectrum image intensifier fabrication method comprising:
depositing a first photodetector array that includes a plurality of first photodetector array elements formed using a first optoelectronic material having a first thickness on a first portion of a first surface of a photocathode substrate disposed transverse to an optical axis of the dual-spectrum image intensifier such that at least a portion of incident photons pass through the photocathode substrate and impinge upon the first photodetector array, the first optoelectronic material to generate photo-electrons responsive to incident photons in a first spectral band;
depositing a second photodetector array that includes a plurality of second photodetector array elements formed using a second optoelectronic material having a second thickness that differs from the first thickness on a second portion of the first surface of the photocathode substrate, each of the plurality of second photodetector array elements including an oxidized metal film that includes at least one of: a silver oxide metal film, a gold oxide metal film, a platinum oxide metal film, a cobalt oxide metal film, or a cuprous oxide metal film, the second optoelectronic material to generate photo-electrons responsive to incident photons in a second spectral band including a portion of the electromagnetic spectrum, the second spectral band different, at least in part, from the first spectral band;
depositing an electron multiplier along the optical axis of the dual-spectrum image intensifier the electron multiplier spaced apart from the photocathode substrate; and
reducing absolute pressure in the space between the dual-spectrum image intensifier the electron multiplier to less than atmospheric pressure.

14. The method of claim 13 wherein depositing the first photodetector array on the first portion of the first surface of the photocathode substrate further comprises:
depositing the first photodetector array on the first surface of a photocathode substrate that provides an entrance window to the dual-spectrum image intensifier.

15. The method of claim 13:
wherein depositing the first photodetector array on the first portion of the first surface of the photocathode substrate further comprises:
depositing a first photodetector array that includes the plurality of first photodetector array elements formed using a first optoelectronic material to generate photo-electrons responsive to incident photons in the first spectral band, the first spectral band including at least a portion of the visible electromagnetic spectrum between 390 nanometers (nm) and 700 nm; and
wherein depositing the second photodetector array on the second portion of the first surface of the photocathode substrate:
depositing a second photodetector array that includes the plurality of second photodetector array elements formed using a second optoelectronic material to generate photo-electrons responsive to incident photons in the second spectral band that includes wavelengths at least a portion of the short-wave infrared electromagnetic spectrum above 900 nanometers (nm).

16. The method of claim 13:
wherein depositing the first photodetector array on the first portion of the first surface of the photocathode substrate comprises:
depositing the first photodetector array that includes a plurality of first photodetector array elements formed using the first optoelectronic material in which the first thickness is greater than or equal to 10 nanometers (nm) proximate the first portion of the first surface of the photocathode substrate;
wherein depositing the second photodetector array on the second portion of the first surface of the photocathode substrate comprises:
depositing the second photodetector array that includes a plurality of second photodetector array elements formed using the second optoelectronic material in which the second thickness is less than 10 nm proximate the second portion of the first surface of the photocathode substrate.

17. The method of claim 13 wherein depositing the first photodetector array on the first portion of the first surface of the photocathode substrate comprises: depositing the first photodetector array such that each of at least a portion of the plurality of first photodetector array elements the at least partially surrounds each of at least a portion of the plurality of second photodetector array elements.

18. The method of claim 13 wherein depositing the first photodetector array proximate the first portion of the first surface of the photocathode substrate comprises: depositing the first photodetector array such that a gap forms between each of at least a portion of the plurality of first photodetector array elements and each of at least a portion of the plurality of the second photodetector array elements.

19. The method of claim 18, further comprising:
depositing an interposer layer in the gap formed between each of at least the portion of the plurality of first photodetector array elements and each of at least the portion of the plurality of the second photodetector array elements.

20. An enhanced vision system, comprising:
an objective lens array;
dual-spectrum image intensifier comprising:
a photocathode that includes:
a first photodetector array that includes a plurality of first photodetector array elements, each of the plurality of first photodetector array elements formed by a first optoelectronic material having a first thickness, the first optoelectronic material to generate photo-electrons in response to incident photons in a first spectral band the first photodetector array disposed proximate a first portion of a first surface of a substrate; and
a second photodetector array that includes a plurality of second photodetector array elements, each of the plurality of second photodetector array elements formed by a second optoelectronic material having a second thickness that is different than the first thickness and including at least one of: a silver oxide metal film, a gold oxide metal film, a platinum oxide metal film, a cobalt oxide metal film, or a cuprous oxide metal film, the second photodetector array to generate photo-electrons in response to incident photons in a second spectral band, the second spectral band including a portion of the electromagnetic spectrum different, at least in part, from the first spectral band, the second photodetector array disposed proximate a second portion of the first surface of the substrate;
wherein the photo-electrons generated by both the first photodetector array and the second photodetector array are emitted into a first vacuum space adjacent to at least a portion of the second photodetector array; and
a microchannel plate to generate secondary electrons, the microchannel plate separated from the photocathode by the first vacuum space;
wherein the secondary electrons generated by the microchannel plate are emitted into a second vacuum space adjacent to the microchannel plate;
a phosphor screen to generate photons corresponding to an enhanced image responsive to incident secondary electrons, the phosphor screen separated from the microchannel plate by the second vacuum space; and
an eyepiece lens array.

* * * * *